US012665292B2

(12) United States Patent
Yamaura et al.

(10) Patent No.: US 12,665,292 B2
(45) Date of Patent: Jun. 23, 2026

(54) ANTENNA DEVICE

(71) Applicant: Mitsubishi Electric Corporation, Tokyo (JP)

(72) Inventors: Shingo Yamaura, Tokyo (JP); Saki Wada, Tokyo (JP); Kengo Nishimoto, Tokyo (JP); Toru Fukasawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 189 days.

(21) Appl. No.: 18/636,442

(22) Filed: Apr. 16, 2024

(65) Prior Publication Data

US 2024/0258691 A1 Aug. 1, 2024

Related U.S. Application Data

(63) Continuation of application No. PCT/JP2021/048068, filed on Dec. 24, 2021.

(51) Int. Cl.

*H01Q 1/12* (2006.01)
*H01Q 1/50* (2006.01)
*H01Q 1/52* (2006.01)
*H01Q 7/00* (2006.01)

(52) U.S. Cl.

CPC ................. *H01Q 1/52* (2013.01); *H01Q 1/50* (2013.01); *H01Q 7/00* (2013.01); *H01Q 1/1285* (2013.01)

(58) Field of Classification Search

CPC .. H01Q 1/52; H01Q 1/50; H01Q 7/00; H01Q 1/1285; H01Q 13/10; H01Q 1/38

See application file for complete search history.

(56) References Cited

U.S. PATENT DOCUMENTS

| | | | | |
|---|---|---|---|---|
| 9,024,826 B2 * | 5/2015 | Tolbert | ................. | H01Q 13/106 343/702 |
| 2010/0261445 A1 | 10/2010 | Harrysson et al. | | |
| 2013/0257659 A1 * | 10/2013 | Darnell | .................. | H05K 1/028 343/702 |
| 2018/0076504 A1 * | 3/2018 | Lo Hine Tong | ....... | H01Q 9/045 |
| 2019/0372205 A1 * | 12/2019 | Ruaro | .................... | H01Q 13/10 |
| 2022/0077595 A1 | 3/2022 | Takayama et al. | | |

FOREIGN PATENT DOCUMENTS

| | | |
|---|---|---|
| JP | 2001-136014 A | 5/2001 |
| JP | 2011-505774 A | 2/2011 |
| WO | WO 2020/230391 A1 | 11/2020 |

OTHER PUBLICATIONS

International Search Report (PCT/ISA/210) issued in PCT/JP2021/048068, mailed on Mar. 15, 2022.

* cited by examiner

*Primary Examiner* — Dimary S Lopez Cruz
*Assistant Examiner* — Michael M Bouizza
(74) *Attorney, Agent, or Firm* — Birch, Stewart, Kolasch & Birch, LLP

(57) ABSTRACT

An antenna device includes; a metal housing in which at least one surface thereof is open; a display unit provided inside the metal housing and configured to perform a display from the one surface of the metal housing toward outside; a first transparent conductor plate present in the display unit; a second transparent conductor plate provided to be spaced apart from the first transparent conductor plate in an outside or inside direction, the second transparent conductor plate to define a gap between the second transparent conductor plate and the metal housing; and a feed unit provided between the metal housing and the second transparent conductor plate.

13 Claims, 16 Drawing Sheets

ANTENNA DEVICE

CROSS-REFERENCE TO RELATED APPLICATION

This application is a Continuation of PCT International Application No. PCT/JP2021/048068, filed on Dec. 24, 2021, which is hereby expressly incorporated by reference into the present application.

TECHNICAL FIELD

The present disclosure relates to an antenna device.

BACKGROUND ART

In the antenna device inferred to be suggested in Patent Literature 1, a band-shaped monopole transparent antenna is provided above an indium tin oxide film (hereinafter, referred to as "ITO film"). When a current flows through the transparent antenna, a current also flows through the ITO film due to capacitive coupling between the transparent antenna and the ITO film.

CITATION LIST

Patent Literatures

Patent Literature 1: JP-T-2011-505774

SUMMARY OF INVENTION

Technical Problem

However, since the ITO film has a large resistance value, there is a problem that a loss caused by the current flowing through the ITO film is large, and as a result, the radiation efficiency of the transparent antenna decreases.

An object of the present disclosure is to provide an antenna device capable of improving the radiation efficiency of an antenna and the directivity gain of a main polarized wave.

Solution to Problem

In order to solve the above problem, an antenna device according to the present disclosure includes: a metal housing in which at least one surface thereof is open; a display circuit provided inside the metal housing and configured to perform a display from the one surface of the metal housing toward outside; a first transparent conductor plate present in the display circuit; a second transparent conductor plate provided to be spaced apart from the first transparent conductor plate in an outside or inside direction, the second transparent conductor plate to define a gap between the second transparent conductor plate and the metal housing; and a feeder provided between the metal housing and the second transparent conductor plate, wherein a ratio of an area of the second transparent conductor plate with respect to an area of the first transparent conductor plate is within a range of 0.6 or more to 1.1 or less.

Advantageous Effects of Invention

According to the antenna device of the present disclosure, it is possible to improve the radiation efficiency of an antenna and the directivity gain of a main polarized wave.

DESCRIPTION OF EMBODIMENTS

Embodiments of an antenna device according to the present disclosure will be described.

<Basic Principle>

Prior to describing the antenna device according to each of the plurality of embodiments, the basic principle common to the antenna devices according to the plurality of embodiments will be described.

<Configuration>

FIG. 1 illustrates a basic principle of an antenna device AS according to the present disclosure.

Figure 1A:
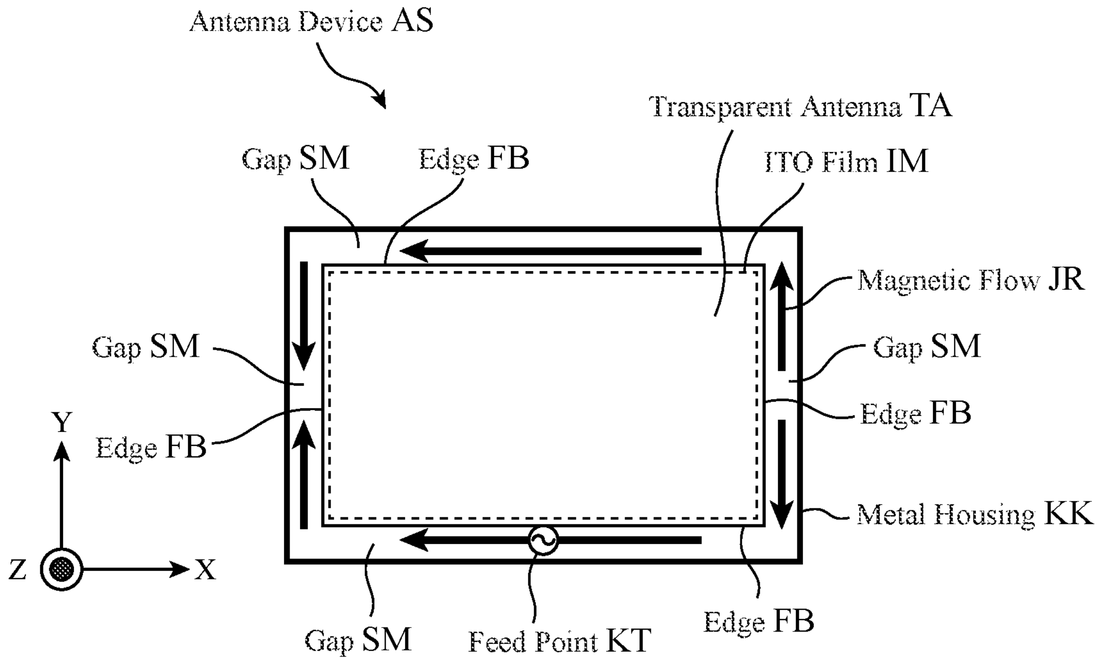
FIG. 1A is a plan view illustrating a configuration of a basic principle of an antenna device AS according to the present disclosure.
Figure 1B:
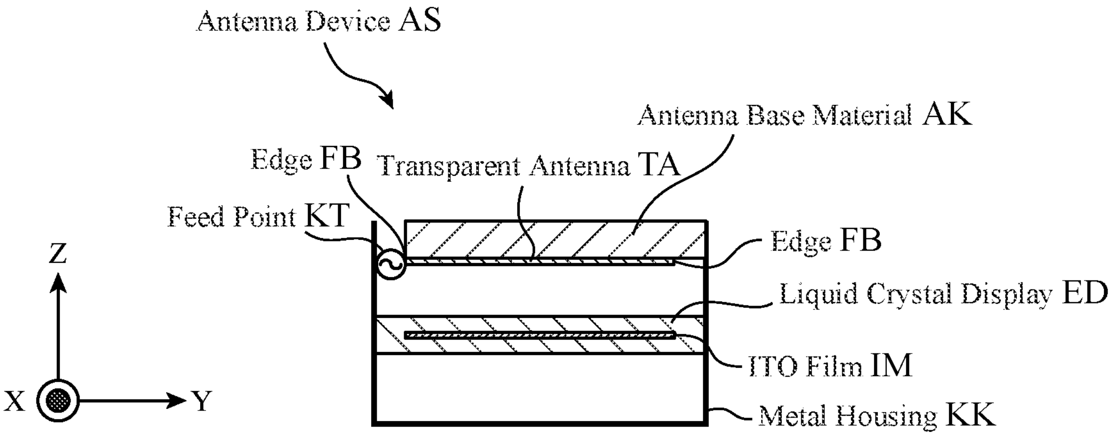
FIG. 1B is a cross-sectional view illustrating the configuration of the basic principle of the antenna device AS according to the present disclosure.

As illustrated in FIG. 1B, the antenna device AS includes a metal housing KK, a liquid crystal display ED, an ITO film IM, an antenna base material AK, a transparent antenna TA, and a feed point KT.

The metal housing KK corresponds to "metal housing", the liquid crystal display ED corresponds to "display unit", the ITO film IM corresponds to "first transparent conductor plate", the antenna base material AK corresponds to "substrate", the transparent antenna TA corresponds to "second transparent conductor plate", and the feed point KT corresponds to "feed unit".

As illustrated in FIGS. 1A and 1B, the metal housing KK has four side surfaces and a bottom surface, more precisely, one or more of the four side surfaces and the bottom surface. In other words, the metal housing KK does not have a flat surface (not illustrated) as at least one surface, that is, the flat surface is opened, so that the opening is defined.

The liquid crystal display ED has a configuration similar to that conventionally known, and is provided inside the metal housing KK as illustrated in FIG. 1A. As suggested in FIG. 1B, the liquid crystal display ED performs a display from the opened flat surface of the metal housing KK, that is, from the opening to the outside, in other words, with the Z axis oriented in the positive direction.

The ITO film IM is present in the liquid crystal display ED as illustrated in FIG. 1B. As conventionally known, the display function of the liquid crystal display ED is ensured by the ITO film IM.

As illustrated in FIG. 1B, the antenna base material AK is provided in the metal housing KK, and the transparent antenna TA is formed on the antenna base material AK.

As illustrated in FIG. 1A, the transparent antenna TA is provided separately from the ITO film IM in the outside direction (positive direction of the Z axis). As illustrated in FIG. 1A, a gap SM is defined between the transparent antenna TA and the metal housing KK. The transparent antenna TA is made of a material having high visible light transmittance and conductivity, and is made of, for example, a metal mesh of fine wiring, an ITO film, graphene, or the like.

The gap SM corresponds to "gap".

The feed point KT is provided between the metal housing KK and the transparent antenna TA to cause the gap SM to function as a slot of a slot antenna, and feeds a high-frequency current (not illustrated) to the transparent antenna TA.

<Operation>

The transparent antenna TA has a resistance value higher than a resistance value of a non-transparent conductor (for example, copper and aluminum). Therefore, the high-frequency current supplied from the feed point KT intensively flows through an edge FB (illustrated in FIGS. 1A and 1B) of the transparent antenna TA. When a high-frequency current flows through the edge FB of the transparent antenna TA, an electric field (not illustrated) is generated between the edge FB of the transparent antenna TA and the metal housing KK. As illustrated in FIG. 1A, it is recognized that a magnetic flow JR is generated in the gap SM by the generated electric field. The antenna device AS operates as a slot antenna in which the generated magnetic flow JR serves as a radiation source and the gap SM serves as a slot.

<Effects>

Figure 19A:
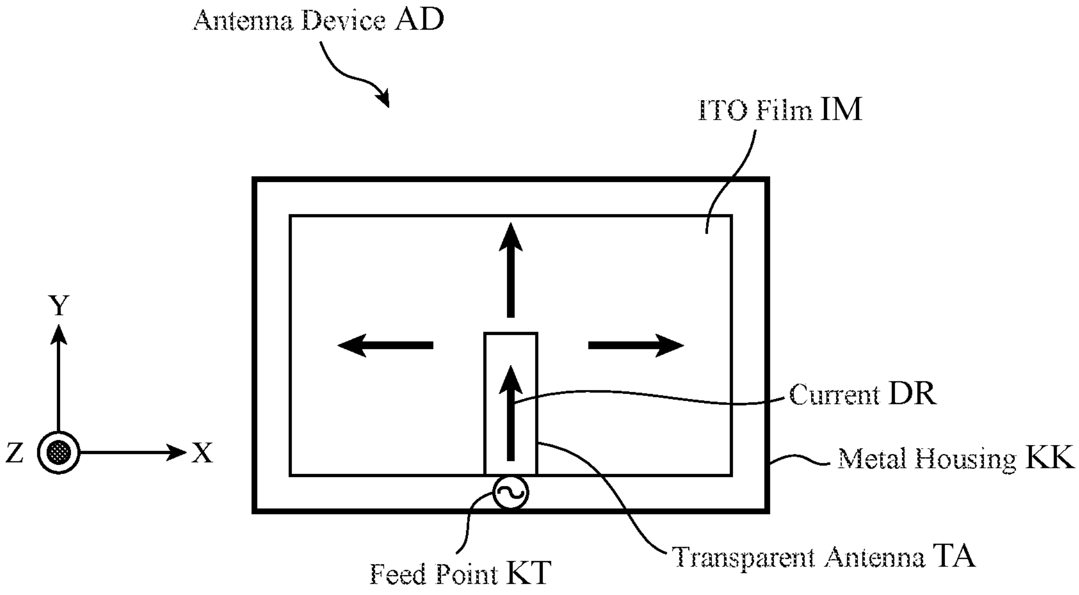
FIG. 19A is a plan view illustrating a configuration of a conventional antenna device AD.
Figure 19B:
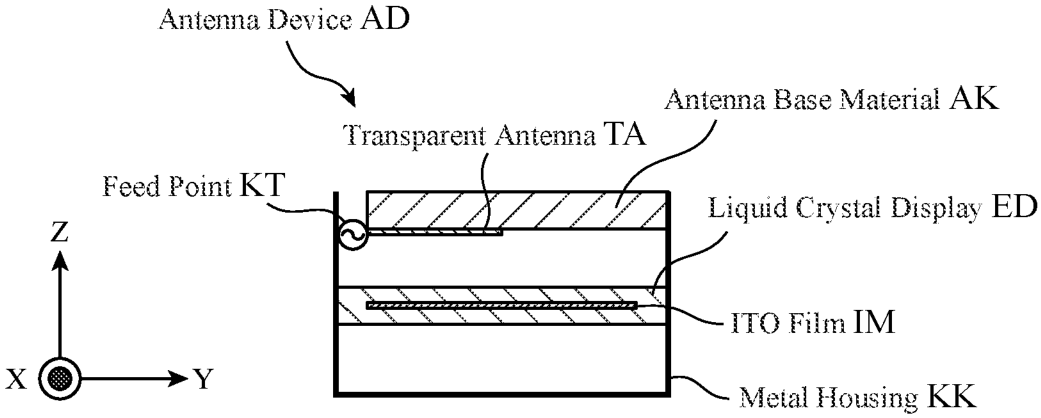
FIG. 19B is a cross-sectional view illustrating the configuration of the conventional antenna device AD.

FIG. 19 illustrates a configuration of a conventional antenna device AD.

In the antenna device AS according to the present disclosure and the conventional antenna device AD, since the ITO film IM is required to have high visible light transmittance, the ITO film IM has a high sheet resistance value of equal to or more than 10Ω/sq.

In the conventional antenna device AD, as illustrated in FIG. 19, the high-frequency current DR supplied from the feed point KT flows through the transparent antenna TA. The current DR flows through the ITO film IM due to the capacitive coupling between the transparent antenna TA and the ITO film IM. As a result, a large loss occurs in the ITO film IM. Due to the occurrence of the loss, the radiation efficiency of the conventional antenna device AD decreases.

The antenna device AS with the basic principle is different from the conventional antenna device AD in that, as illustrated in FIG. 1, the gap SM is defined between the transparent antenna TA and the metal housing KK. Due to the capacitive coupling between the transparent antenna TA and the metal housing KK caused by the presence of the gap SM, a current flows through the metal housing KK. As a result, it is possible to suppress a situation in which the current DR flows through the ITO film IM due to the capacitive coupling between the transparent antenna TA and the ITO film IM.

In the antenna device AS with the basic principle, in addition to the above, the magnetic flow JR flowing through the gap SM is used as a radiation source. As a result, the antenna device AS with the basic principle operates as a slot antenna in which the gap SM serves as a slot.

FIRST EMBODIMENT

First Embodiment

An antenna device according to a first embodiment will be described.

Configuration of First Embodiment

FIG. 2 illustrates a configuration of an antenna device AS according to the first embodiment.

As illustrated in FIG. 2, the antenna device AS according to the first embodiment includes the metal housing KK, the liquid crystal display ED, the ITO film IM, the antenna base material AK (not illustrated in FIG. 2, but illustrated in FIG. 1B), the transparent antenna TA, and the feed point KT.

The configuration of the antenna device AS according to the first embodiment is basically similar to the configuration of the antenna device AS (illustrated in FIG. 1) with the basic principle.

On the other hand, the antenna device AS according to the first embodiment is substantially or formally different from the antenna device AS with the basic principle in the following points.

Figure 2A:
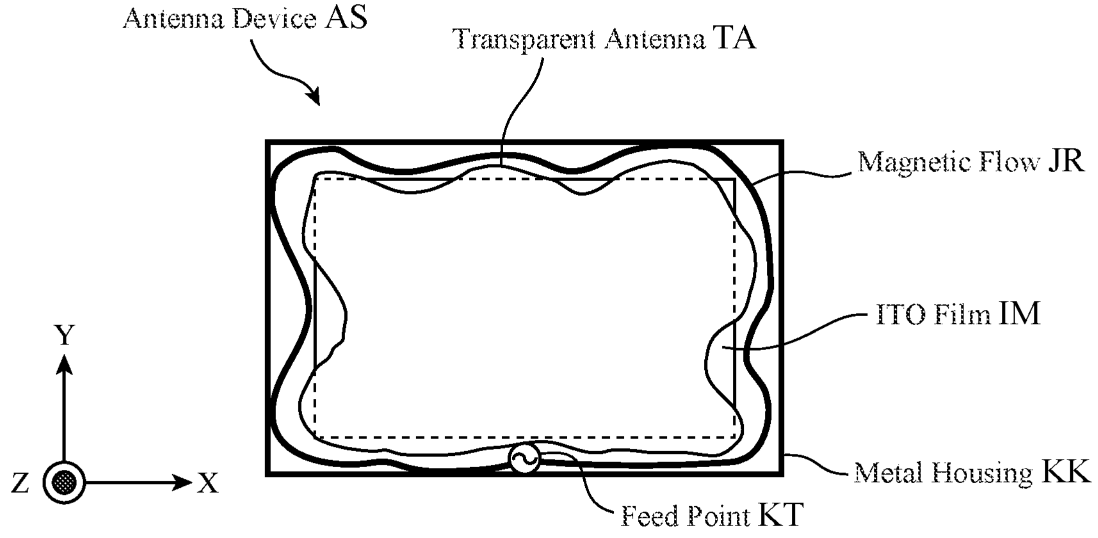
FIG. 2A is a plan view illustrating a configuration of an antenna device AS according to a first embodiment.

The transparent antenna TA has, for example, a substantially rectangular shape as illustrated in FIG. 2A. More specifically, although the four sides of the transparent antenna TA are theoretically allowed to have an uneven shape, that is, a wavy shape, the four sides are actually along the four surfaces (two XZ planes and two YZ planes), which are the side surfaces of the metal housing KK, in other words, desirably parallel to the four surfaces of the metal housing KK.

Figure 2B:
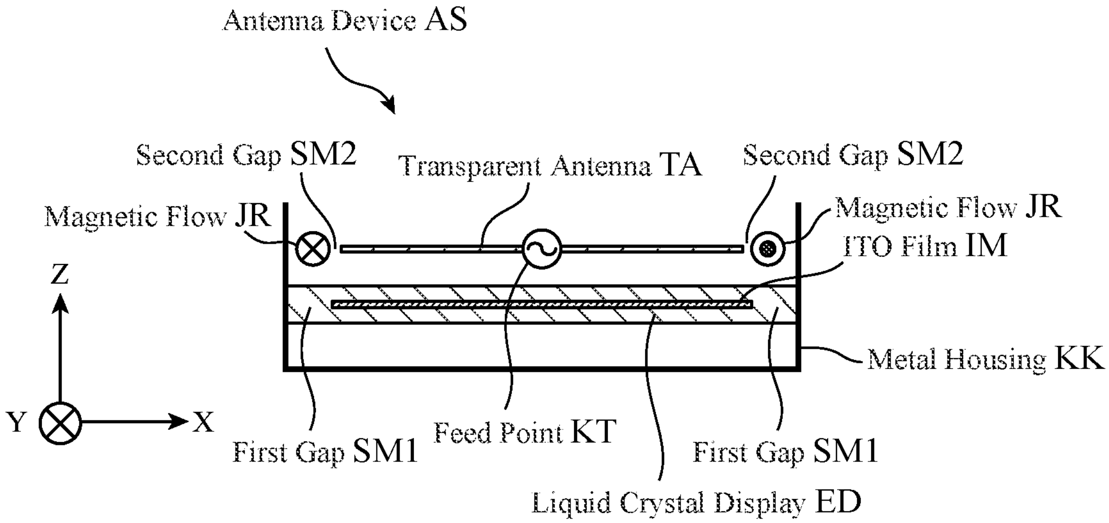
FIG. 2B is a cross-sectional view illustrating the configuration of the antenna device AS according to the first embodiment.

As illustrated in FIG. 2B, a first gap SM1 is defined between the ITO film IM and the metal housing KK.

As illustrated in FIG. 2B, a second gap SM2 is defined between the transparent antenna TA and the metal housing KK.

The second gap SM2 corresponds to "gap".

Operation of First Embodiment

The feed point KT supplies a high-frequency current to the transparent antenna TA. In the transparent antenna TA, the high-frequency current intensively flows through the edge FB (illustrated in FIGS. 1A and 1B) of the transparent antenna TA. By the high-frequency current flowing through the edge FB of the transparent antenna TA, an electric field (not illustrated) is generated in the second gap SM2 between the edge FB of the transparent antenna TA and the metal housing KK. It is recognized that the magnetic flow JR is generated along the second gap SM2 by the generated electric field. The antenna device AS operates as a slot antenna in which the magnetic flow JR serves as a radiation source and the second gap SM2 serves as a slot.

Effects of First Embodiment

As described above, the antenna device AS according to the first embodiment has the second gap SM2 (illustrated in FIG. 2B) corresponding to the gap SM (illustrated in FIG. 1A) in the antenna device AS with the basic principle. As a result, similarly to the antenna device AS with the basic principle, the antenna device AS according to the first embodiment can improve the radiation efficiency as compared with the conventional antenna device AD (illustrated in FIG. 19).

Modifications

Figure 3:
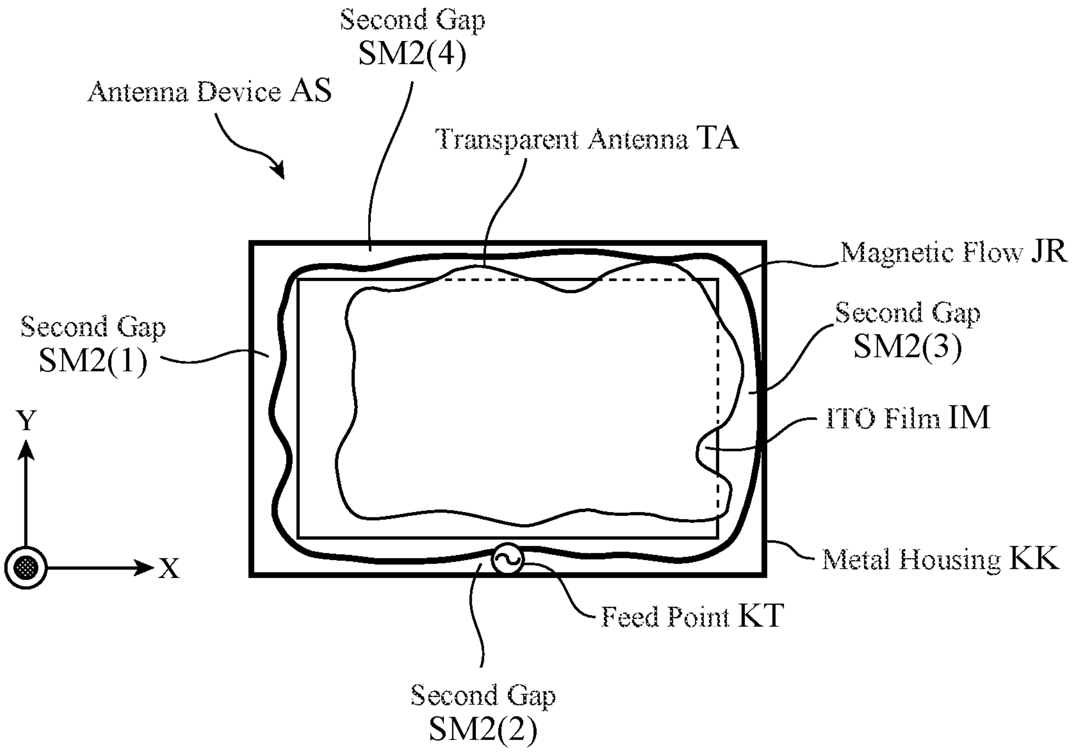
FIG. 3 is a plan view illustrating a configuration of an antenna device AS according to a modification of the first embodiment.

FIG. 3 illustrates a configuration of an antenna device AS according to a modification of the first embodiment.

In the antenna device AS according to the modification, as illustrated in FIG. 3, among the second gaps SM2 (illustrated in FIG. 2B, corresponding to four gaps SM illustrated in FIG. 1A) between the transparent antenna TA and the metal housing KK, the length of second gaps SM2(1) and SM2(2) is longer than the length of the other second gaps SM2(3) and SM2(4).

Similarly to the antenna device AS according to the first embodiment, in the antenna device AS according to the modification, while the current DR flowing through the ITO film IM in the conventional antenna device AD (illustrated in FIG. 19) is suppressed, even if the length of the second gaps SM2(1) and SM2(2) is longer than that of the other second gaps SM2(3) and SM2(4), the radiation efficiency of the antenna device AS according to the modification can be improved as compared with the conventional antenna device AD although it is not as high as the radiation efficiency of the antenna device AS according to the first embodiment.

SECOND EMBODIMENT

Second Embodiment

An antenna device according to a second embodiment will be described.

Configuration of Second Embodiment

Figure 4A:
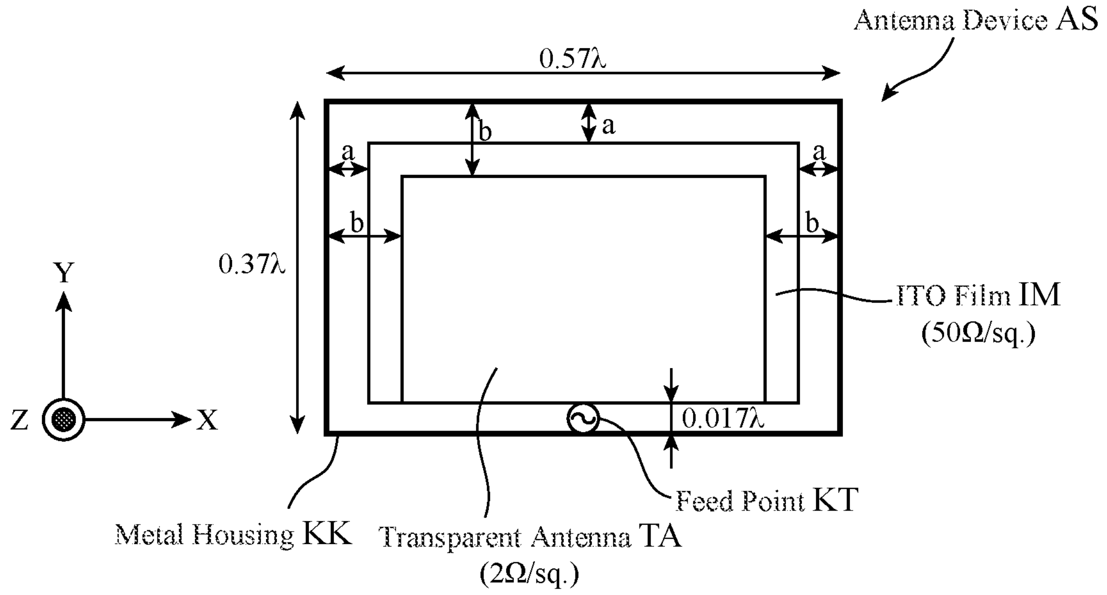
FIG. 4A is a plan view illustrating a configuration of an antenna device AS according to a second embodiment.

FIG. 4 illustrates a configuration of an antenna device AS according to the second embodiment.

As illustrated in FIG. 4, the configuration of the antenna device AS according to the second embodiment is basically similar to the configuration of the antenna device AS according to the first embodiment (illustrated in FIG. 2). For example, similarly to the transparent antenna TA of the first embodiment, the transparent antenna TA of the second embodiment is substantially rectangular, that is, has a rectangular shape.

In the antenna device AS according to the second embodiment, on the premise that the transparent antenna TA and the ITO film IM are rectangular, the relationship between the transparent antenna TA and the ITO film IM is defined, unlike the antenna device AS according to the first embodiment.

For convenience of description, the following is defined.

(1) The dimension (length) of the first gap SM1 is defined as a variable "a".

(2) The dimension (length) of the second gap SM2 is defined as a variable "b".

(3) The wavelength of a normalized frequency f0 is defined as λ.

From the viewpoint of narrowing a bezel (a frame portion surrounding periphery of the liquid crystal display ED in the metal housing KK), the shape of the ITO film IM is desirably the same as the shape of the opening (described in the first embodiment) of the metal housing KK.

Figure 4B:
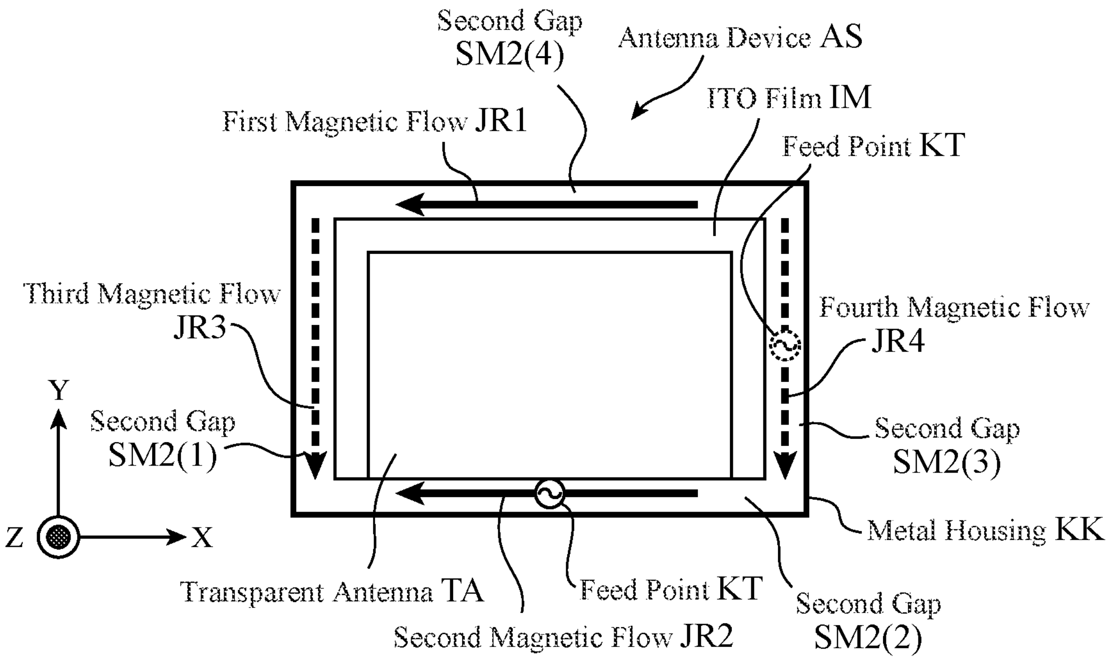
FIG. 4B is a plan view illustrating an operation of the antenna device AS according to the second embodiment.

As illustrated in FIG. 4B, in a case where the feed point KT (illustrated in solid line) is provided in the second gap SM2(2), a first magnetic flow JR1 flowing along the second gap SM2(4) and a second magnetic flow JR2 flowing along the second gap SM2(2) (both are illustrated in solid lines) serve as radiation sources, and as a result, polarized waves (not illustrated) in a direction parallel to the Y axis are radiated as main polarized waves.

In contrast to the above, in a case where the feed point KT (illustrated in dotted lines) is provided in the second gap SM2(3), a third magnetic flow JR3 flowing along the second gap SM2(1) and a fourth magnetic flow JR4 flowing along the second gap SM2(3) (both are illustrated in dotted lines) serve as radiation sources, and as a result, polarized waves (not illustrated) in a direction parallel to the X axis are radiated as main polarized waves.

By forming the transparent antenna TA into a rectangular shape similar to the opening of the metal housing KK, the direction of the first magnetic flow JR1 and the direction of the second magnetic flow JR2 can be made the same (the X-axis direction), and similarly, the direction of the third magnetic flow JR3 and the direction of the fourth magnetic flow JR4 can be made the same (the Y-axis direction). As a result, the directivity gain of the main polarized wave can be improved.

Figure 5:
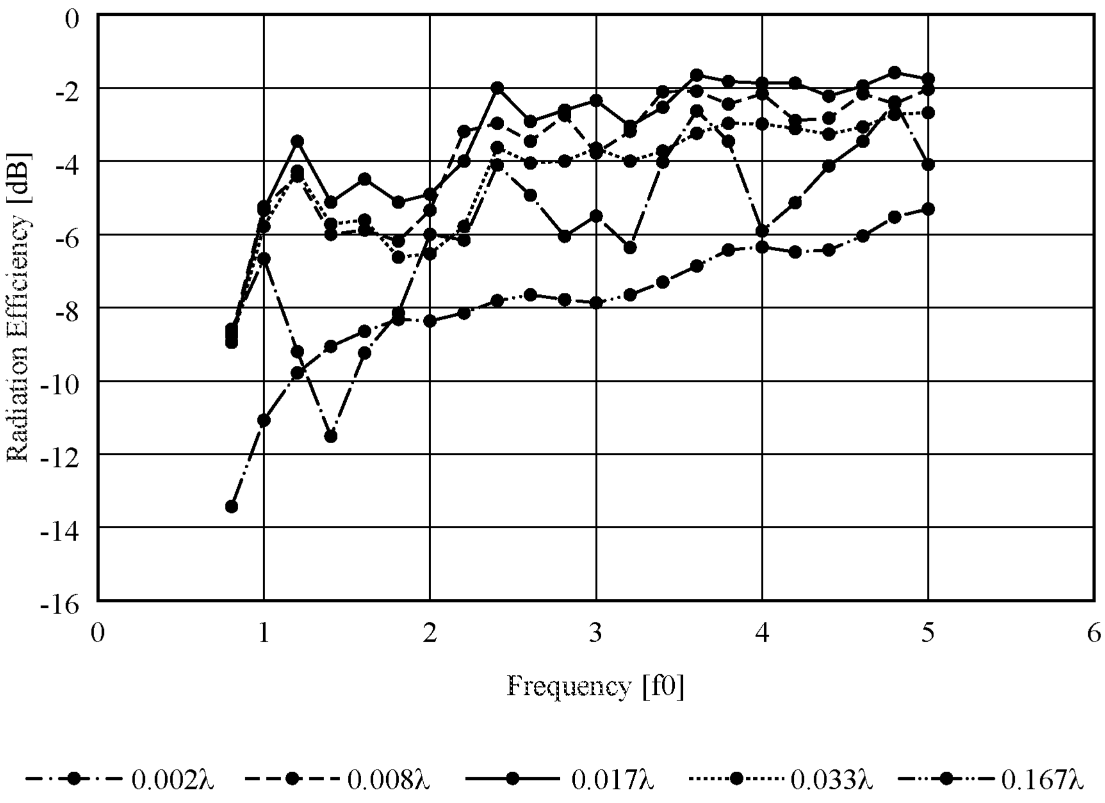
FIG. 5 illustrates a relationship between a frequency and radiation efficiency in the second embodiment.

FIG. 5 illustrates a relationship between a frequency and radiation efficiency in the second embodiment. In the legend, the dimension "b" is normalized by the wavelength of the frequency f0. In addition, the dimension "a" is fixed to 0.0172.

Figure 6:
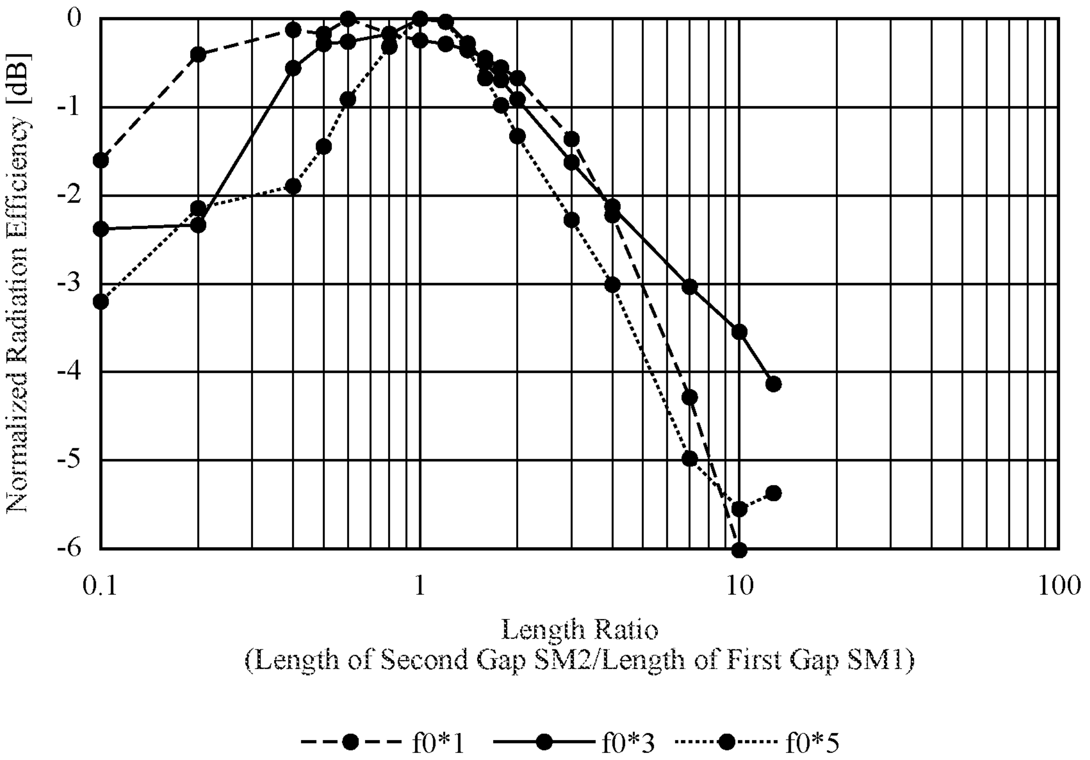
FIG. 6 illustrates a relationship between a ratio of lengths of gaps SM1 and SM2 and normalized radiation efficiency in the second embodiment.

FIG. 6 illustrates a relationship between the ratio of lengths of the gaps SM1 and SM2 and normalized radiation efficiency in the second embodiment.

Figure 7:
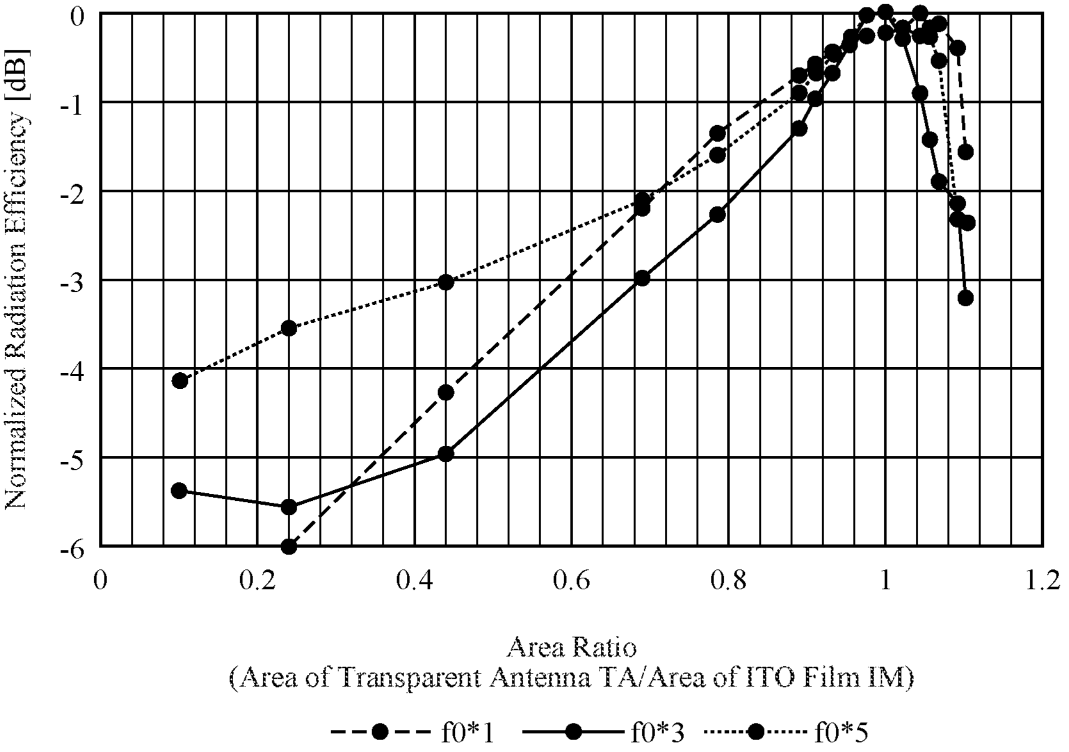
FIG. 7 illustrates a relationship between a ratio of areas of a transparent antenna TA and an ITO film IM and the normalized radiation efficiency in the second embodiment.

FIG. 7 illustrates a relationship between the ratio of areas of the transparent antenna TA and the ITO film IM and the normalized radiation efficiency in the second embodiment.

In FIGS. 5 to 7, the radiation efficiency does not include any mismatch loss.

In FIGS. 6 and 7, the normalized radiation efficiency is obtained by normalizing the radiation efficiency with the maximum value of each frequency.

In the antenna device AS according to the second embodiment, as illustrated in FIG. 5, in the range of the dimension "b" of 0.002λ to 0.167λ, when it is recognized that the dimension "b" is 0.017λ and a=b, that is, the length of the first gap SM1 is substantially equal to the length of the second gap SM2, the radiation efficiency is maximized. In other words, the condition for maximizing the radiation efficiency of the antenna device AS according to the second embodiment is to make the length of the first gap SM1 substantially equal to the length of the second gap SM2.

In the antenna device AS according to the second embodiment, the normalized radiation efficiency is maximized when it is recognized that a=b, that is, the length of the first gap SM1 is substantially equal to the length of the second gap SM2, as illustrated in FIG. 6.

In the antenna device AS according to the second embodiment, the standardized radiation efficiency is maximized when it is recognized that the area of the transparent antenna TA is substantially equal to the area of the ITO film IM, as illustrated in FIG. 7.

The phrase "substantially equal" means, for example, a range until the radiation efficiency is reduced by half, that is, a range until the radiation efficiency is reduced by 3 dB, and for example, a range in which the area ratio is equal to or more than about 0.6.

It can be said from FIGS. 5 to 7 that the condition for maximizing the radiation efficiency of the antenna device AS according to the second embodiment is to make the shape and size of the transparent antenna TA substantially equal to the shape and size of the ITO film IM.

Effects of Second Embodiment

As described above, in the antenna device AS according to the second embodiment, by making both the shape and the size of the transparent antenna TA substantially equal to both the shape and the size of the ITO film IM, the radiation efficiency of the antenna device AS according to the second embodiment can be further improved as compared with the radiation efficiency of the antenna device AS according to the first embodiment.

In the antenna device AS according to the second embodiment, by making only the shape of the transparent antenna TA substantially equal to the shape of the opening of the metal housing KK, the direction of the first magnetic flow JR1 and the direction of the second magnetic flow JR2 can be made the same, or the direction of the third magnetic flow JR3 and the direction of the fourth magnetic flow JR4 can be made the same, so that the directivity gain of the main polarized wave can be improved as compared with the directivity gain of the main polarized wave of the first embodiment.

Modifications

Figure 8:
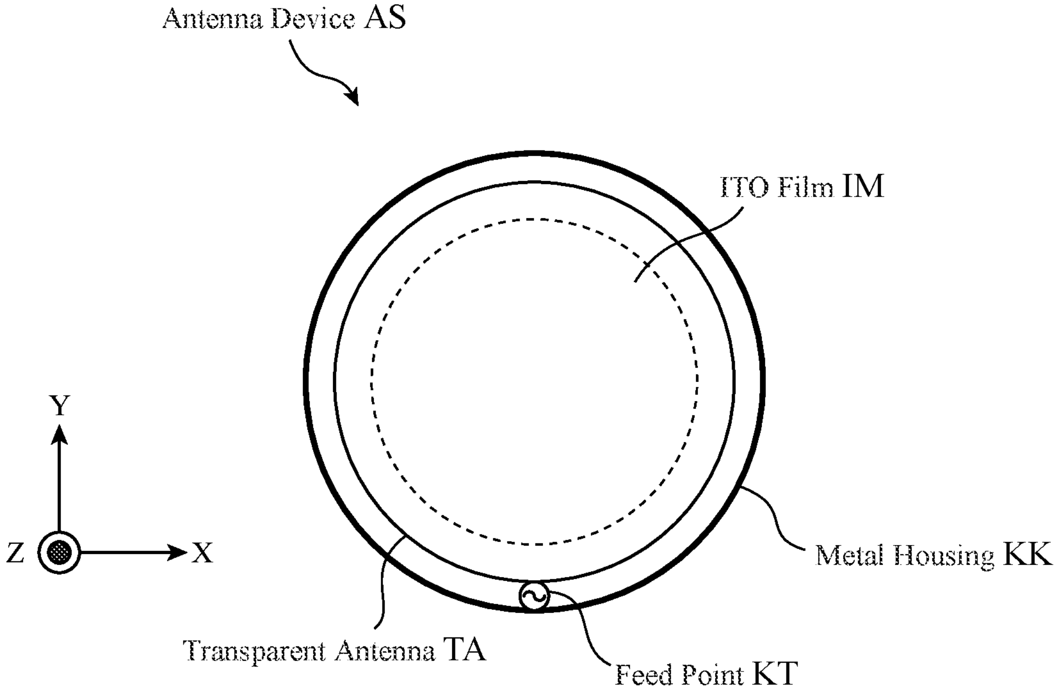
FIG. 8 is a plan view illustrating a configuration of an antenna device AS according to a first modification of the second embodiment.

FIG. 8 illustrates a configuration of an antenna device AS according to a first modification of the second embodiment.

FIG. 9 illustrates configurations of antenna devices AS according to a second modification and a third modification of the second embodiment.

In the antenna device AS according to the first modification, as illustrated in FIG. 8, the transparent antenna TA and the ITO film IM are circular in shape and similar in shape, but are not equal in size.

Figure 9A:
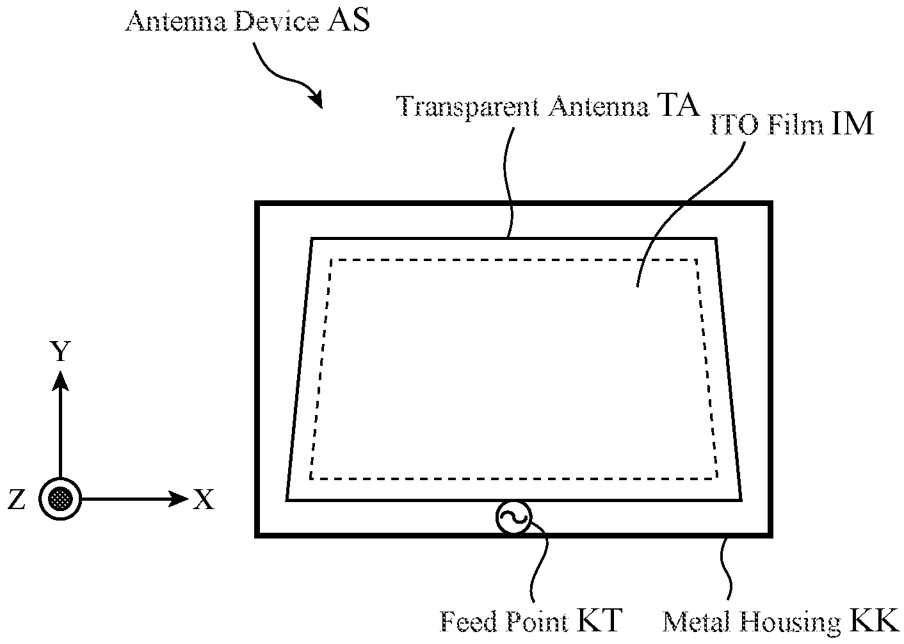
FIG. 9A is a plan view illustrating a configuration of an antenna device AS according to a second modification of the second embodiment.

In the antenna device AS according to the second modification, as illustrated in FIG. 9A, the transparent antenna TA and the ITO film IM are trapezoidal in shape and substantially similar in shape, but are not equal in size.

Figure 9B:
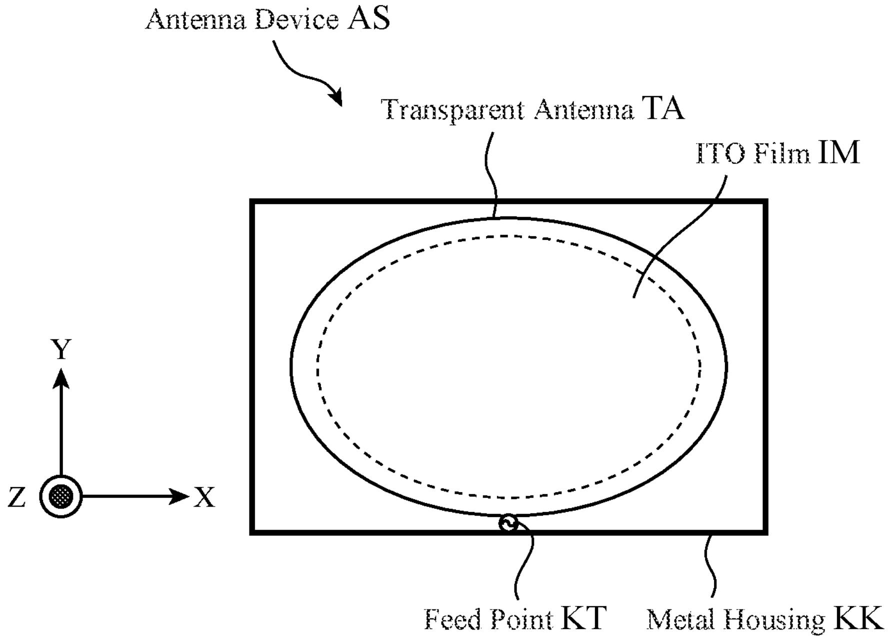
FIG. 9B is a plan view illustrating a configuration of an antenna device AS according to a third modification of the second embodiment.

In the antenna device AS according to the third modification, as illustrated in FIG. 9B, the transparent antenna TA and the ITO film IM are elliptical in shape and substantially similar in shape, but are not equal in size.

Even in the antenna devices AS according to the first to third modifications, although not as much as the antenna device AS according to the second embodiment, the radiation efficiency can be improved as compared with the conventional antenna device AD (illustrated in FIG. 19).

More desirably, the transparent antennas TA and the ITO films IM according to the first to third modifications have substantially the same size as in the second embodiment. As a result, the radiation efficiency can be further improved as compared with the case where the sizes are not equal.

THIRD EMBODIMENT

Third Embodiment

An antenna device according to a third embodiment will be described.

Configuration of Third Embodiment

FIG. 10 illustrates a configuration of an antenna device AS according to the third embodiment.

Figure 10A:
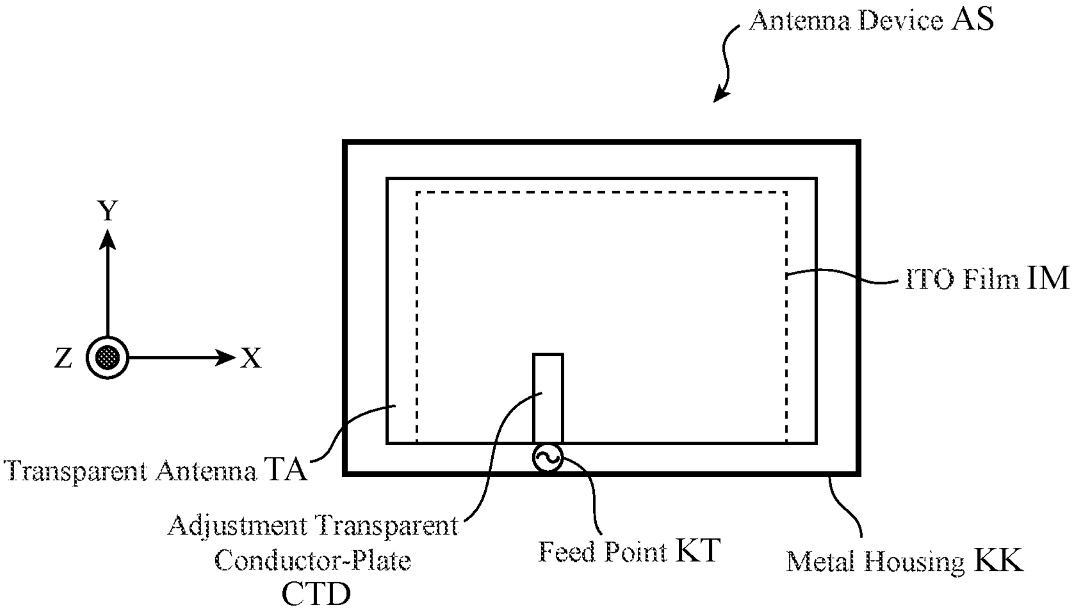
FIG. 10A is a plan view illustrating a configuration of an antenna device AS according to a third embodiment.
Figure 10B:
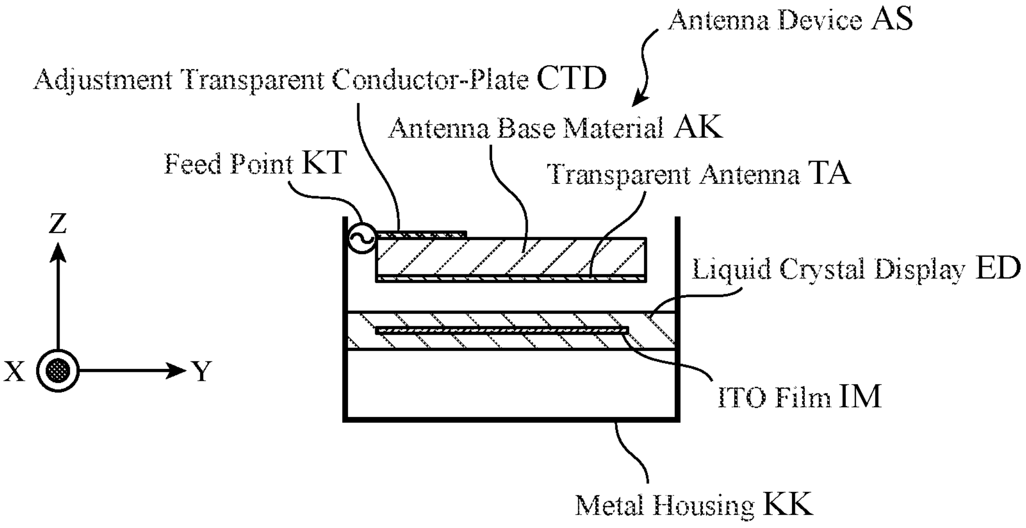
FIG. 10B is a cross-sectional view illustrating the configuration of the antenna device AS according to the third embodiment.

As illustrated in FIGS. 10A and 10B, the configuration of the antenna device AS according to the third embodiment is basically similar to the configuration of the antenna device AS according to the first embodiment (illustrated in FIG. 2).

On the other hand, unlike the antenna device AS according to the first embodiment, the antenna device AS according to the third embodiment further includes an adjustment transparent conductor-plate CTD as illustrated in FIGS. 10A and 10B. In the antenna device AS according to the third embodiment, as illustrated in FIGS. 10A and 10B, the feed point KT is provided between the adjustment transparent conductor-plate CTD and the metal housing KK. In other words, the adjustment transparent conductor-plate CTD is provided between the feed point KT and the transparent antenna TA.

The adjustment transparent conductor-plate CTD corresponds to "adjustment transparent conductor-plate".

For example, as illustrated in FIG. 10B, the adjustment transparent conductor-plate CTD may be provided at a position spaced apart in a direction from the transparent antenna TA toward the opening (described in the first embodiment) of the metal housing KK (the positive direction of the Z axis). In contrast to the above, the adjustment transparent conductor-plate CTD may be provided at a position (not illustrated) spaced apart in a direction from the transparent antenna TA toward the ITO film IM (the negative direction of the Z axis).

Similarly to the transparent antenna TA, the adjustment transparent conductor-plate CTD is made of, for example, a metal mesh of fine wiring, an ITO film, graphene, or the like. The adjustment transparent conductor-plate CTD may have, for example, a band shape or a triangular shape for ensuring a wider bandwidth.

As illustrated in FIG. 10B, the adjustment transparent conductor-plate CTD is formed on the surface (the bottom surface) facing the surface (the upper surface) of the antenna base material AK on which the transparent antenna TA is formed. As described above, the adjustment transparent conductor-plate CTD may be formed on, for example, a base material (not illustrated) separate from the antenna base material AK, instead of being formed on the antenna base material AK. The length of the adjustment transparent conductor-plate CTD in the Y-axis direction is a quarter wavelength of the operating frequency or a wavelength of a higher mode standing wave, and the distal end (the end not connected to the feed point KT) is open.

Operation of Third Embodiment

Since the adjustment transparent conductor-plate CTD has the configuration described above, for example, the adjustment transparent conductor-plate CTD operates as an open stub with a quarter wavelength. The high-frequency current flowing through the adjustment transparent conductor-plate CTD has a standing wave distribution in which the high-frequency current is maximum near the feed point KT and minimum near the distal end. In other words, since the high-frequency current is maximized near the second gap SM2, it is equivalent to the fact that the high-frequency current is maximized at the edge FB (illustrated in FIGS. 1A and 1B) of the transparent antenna TA in the basic principle described above. As a result, the antenna device AS according to the third embodiment operates as a slot antenna similarly to the antenna device AS with the basic principle (illustrated in FIGS. 1A and 1B).

Effects of Third Embodiment

As described above, in the antenna device AS according to the third embodiment, the adjustment transparent conductor-plate CTD is provided between the feed point KT and the transparent antenna TA. Accordingly, by changing the length and width of the adjustment transparent conductor-plate CTD itself and the distance between the adjustment transparent conductor-plate CTD and the transparent antenna TA, for example, the input impedance when viewing the transparent antenna TA from the feed point KT can be adjusted. Therefore, the mismatch loss between the feed point KT and the transparent antenna TA can be reduced, and with the reduction in mismatch loss, the radiation efficiency can be improved as compared with the case where the adjustment transparent conductor-plate CTD is not provided.

FOURTH EMBODIMENT

Fourth Embodiment

An antenna device according to a fourth embodiment will be described.

Configuration of Fourth Embodiment

Figure 11:
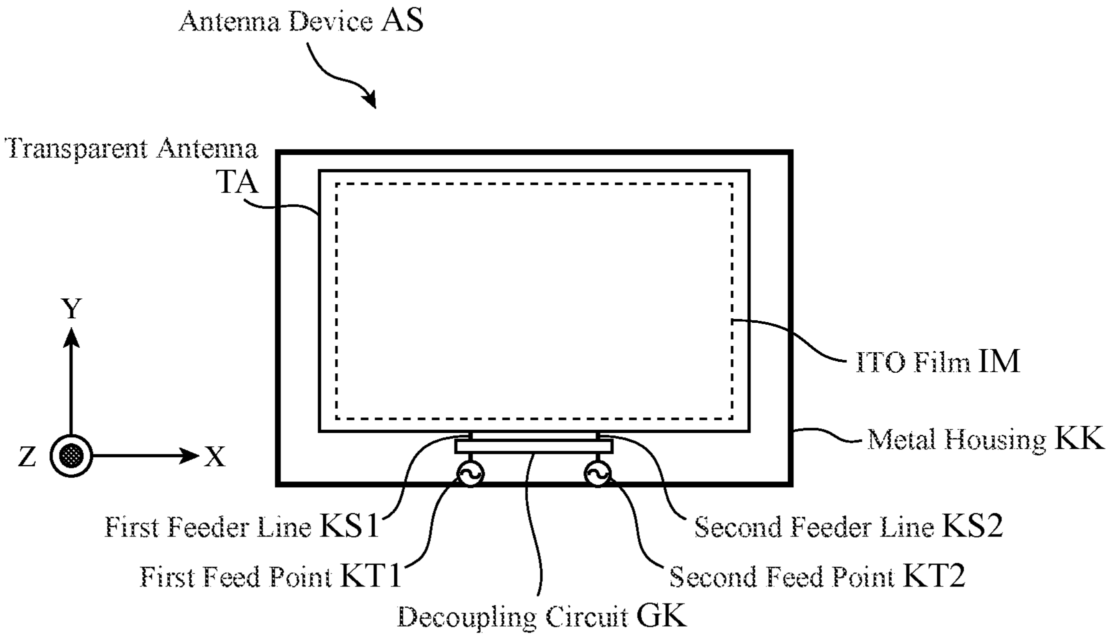
FIG. 11 is a plan view illustrating a configuration of an antenna device AS according to a fourth embodiment.

FIG. 11 illustrates a configuration of an antenna device AS according to the fourth embodiment.

As illustrated in FIG. 11, the configuration of the antenna device AS according to the fourth embodiment is basically similar to the configuration of the antenna device AS according to the first embodiment (illustrated in FIG. 2).

As illustrated in FIG. 11, the antenna device AS according to the fourth embodiment is different from the antenna device AS according to the first embodiment in that two feed points, that is, a first feed point KT1 and a second feed point KT2 are provided between the transparent antenna TA and the metal housing KK.

The antenna device AS according to the fourth embodiment also includes a first feeder line KS1 (for example, for 1 GHz) that connects the first feed point KT1 and the transparent antenna TA to each other, and a second feeder line KS2 that connects the second feed point KT2 and the transparent antenna TA to each other.

The antenna device AS according to the fourth embodiment further includes a decoupling circuit GK between the first feed point KT1 and the second feed point KT2.

Operation of Fourth Embodiment

If the first feed point KT1 and the second feed point KT2 are close to each other and there is no decoupling circuit GK, for example, the high-frequency current supplied from the first feed point KT1 flows into the second feed point KT2 via the transparent antenna TA. Similarly, the high-frequency current supplied from the second feed point KT2 flows into the first feed point KT1 via the transparent antenna TA. Due to the inflow (coupling) of the high-frequency current from the first feed point KT1 to the second feed point KT2 and the inflow (coupling) of the high-frequency current from the second feed point KT2 to the first feed point KT1 as described above, the radiation efficiency of the antenna device AS decreases.

In the antenna device AS according to the fourth embodiment, the decoupling circuit GK suppresses the inflow, that is, coupling. Specifically, for example, the decoupling circuit GK offsets the positive-phase high-frequency current from the first feed point KT1 to the second feed point KT2 via the transparent antenna TA by superimposing the negative-phase high-frequency current on the positive-phase high-frequency current. Similarly, the decoupling circuit GK offsets the positive-phase high-frequency current from the second feed point KT2 to the first feed point KT1 via the transparent antenna TA by superimposing the negative-phase high-frequency current on the positive-phase high-frequency current. As a result, the radiation efficiency of the antenna device AS according to the fourth embodiment can be improved as compared with the case where the decoupling circuit GK is not provided.

Effects of Fourth Embodiment

As described above, in the antenna device AS according to the fourth embodiment, the decoupling circuit GK suppresses the occurrence of the loss due to the coupling. As a result, the radiation efficiency of the antenna device AS according to the fourth embodiment can be improved as compared with the case where the decoupling circuit GK is not provided.

The antenna device AS according to the fourth embodiment can be adopted in a diversity antenna system (not illustrated) in which the frequency of the high-frequency current supplied from the first feed point KT1 and the frequency of the high-frequency current supplied from the second feed point KT2 are the same as each other.

The antenna device AS according to the fourth embodiment can also be adopted in a multiband antenna system in which the frequency of the high-frequency current supplied from the first feed point KT1 and the frequency of the high-frequency current supplied from the second feed point KT2 are different from each other.

Modifications

In the antenna device AS according to a modification of the fourth embodiment, for example, three or more feed points KT and two or more decoupling circuits GK may be used instead of using the two feed points KT1 and KT2 and one decoupling circuit GK described above.

FIFTH EMBODIMENT

Fifth Embodiment

An antenna device according to a fifth embodiment will be described.

Configuration of Fifth Embodiment

Figure 12:
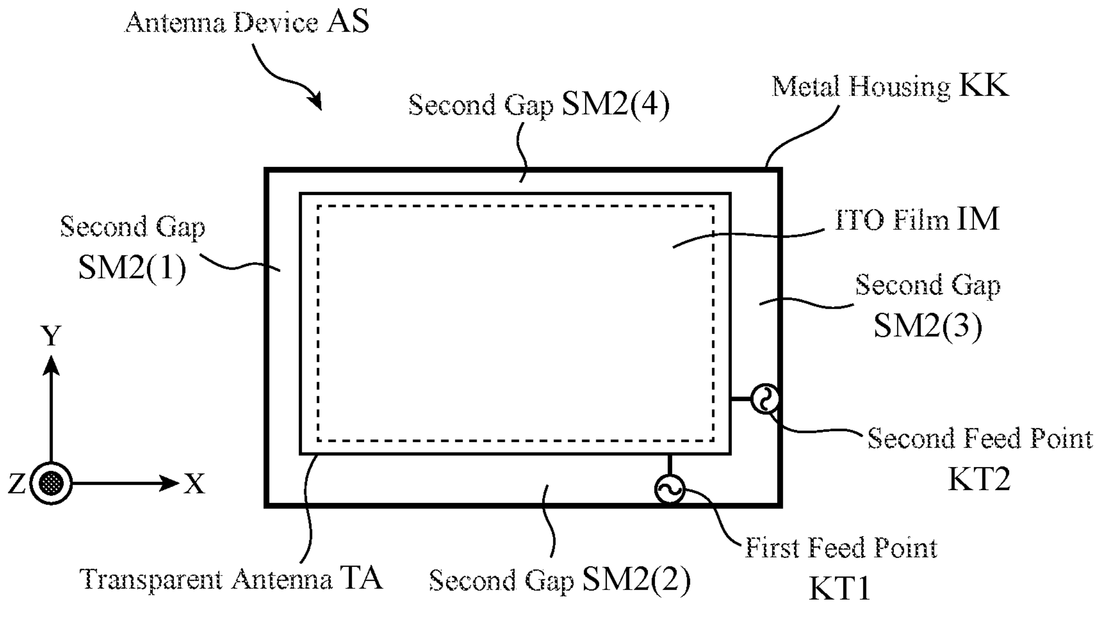
FIG. 12 is a plan view illustrating a configuration of an antenna device AS according to a fifth embodiment.

FIG. 12 illustrates a configuration of an antenna device AS according to the fifth embodiment.

As illustrated in FIG. 12, the configuration of the antenna device AS according to the fifth embodiment is basically similar to the configuration of the antenna device AS according to the first embodiment (illustrated in FIG. 2).

As illustrated in FIG. 12, unlike the antenna device AS according to the first embodiment, the antenna device AS according to the fifth embodiment further includes two feed points KT, that is, the first feed point KT1 and the second feed point KT2.

As illustrated in FIG. 12, the first feed point KT1 and the second feed point KT2 are arranged between the transparent antenna TA and the metal housing KK in such a manner that the high-frequency current (not illustrated) flowing from the first feed point KT1 to the transparent antenna TA and the high-frequency current (not illustrated) flowing from the second feed point KT2 to the transparent antenna TA are orthogonal to each other. Specifically, as illustrated in FIG. 12, the first feed point KT1 is disposed in the second gap SM2(2), whereas the second feed point KT2 is disposed in the second gap SM2(3).

The first feed point KT1 may be disposed in the second gap SM2(4) instead of the above arrangement, and the second feed point KT2 may be disposed in the second gap SM2(1) instead of the above arrangement.

Operation of Fifth Embodiment

In the antenna device AS according to the fifth embodiment, the high-frequency current (not illustrated) supplied from the first feed point KT1 flows in the Y-axis direction on the transparent antenna TA, and as a result, the magnetic flow JR (not illustrated) serving as a radiation source flows in the X-axis direction.

On the other hand, the high-frequency current (not illustrated) supplied from the second feed point KT2 flows in the X-axis direction on the transparent antenna TA, and as a result, the magnetic flow JR (not illustrated) serving as a radiation source flows in the Y-axis direction.

Effects of Fifth Embodiment

As described above, in the antenna device AS according to the fifth embodiment, the first feed point KT1 and the second feed point KT2 are arranged at positions on the transparent antenna TA in such a manner that the direction in which the high-frequency current supplied from the first feed point KT1 flows and the direction in which the high-frequency current supplied from the second feed point KT2 flows are orthogonal to each other. This makes it possible to suppress coupling (described in the fourth embodiment) of the two high-frequency currents.

In the antenna device AS according to the fifth embodiment, in addition to the above effect, the direction in which the high-frequency current supplied from the first feed point KT1 flows and the direction in which the high-frequency current supplied from the second feed point KT2 flows are orthogonal to each other unlike the antenna device AS according to the fourth embodiment, so that the loss due to coupling is minimized. In addition, since the decoupling circuit is unnecessary, the loss due to the decoupling circuit does not occur. Therefore, the loss can be reduced as compared with the antenna device AS according to the fourth embodiment, and as a result, the radiation efficiency can be improved.

In the antenna device AS according to the fifth embodiment, as described above, since two high-frequency currents are orthogonal to each other, two polarized waves generated in the order of two high-frequency currents→two magnetic flows JR (not illustrated)→two polarized waves (not illustrated) are also orthogonal to each other. Therefore, the antenna device AS according to the fifth embodiment can be adopted in a diversity antenna system in which polarized waves are orthogonal to each other.

SIXTH EMBODIMENT

Sixth Embodiment

An antenna device according to a sixth embodiment will be described.

Configuration of Sixth Embodiment

FIG. 13 illustrates a configuration of an antenna device AS according to the sixth embodiment.

As illustrated in FIG. 13, the configuration of the antenna device AS according to the sixth embodiment is basically similar to the configuration of the antenna device AS according to the first embodiment (illustrated in FIG. 2).

Unlike the antenna device AS according to the first embodiment, the antenna device AS according to the sixth embodiment further includes at least one high-frequency short-circuit point KTT as illustrated in FIG. 13. The high-frequency short-circuit point KTT is disposed between the transparent antenna TA and the metal housing KK.

The high-frequency short-circuit point KTT corresponds to "short-circuit unit".

Operation and Effect of Sixth Embodiment

<Case of One High-Frequency Short-Circuit Point>

Figure 13A:
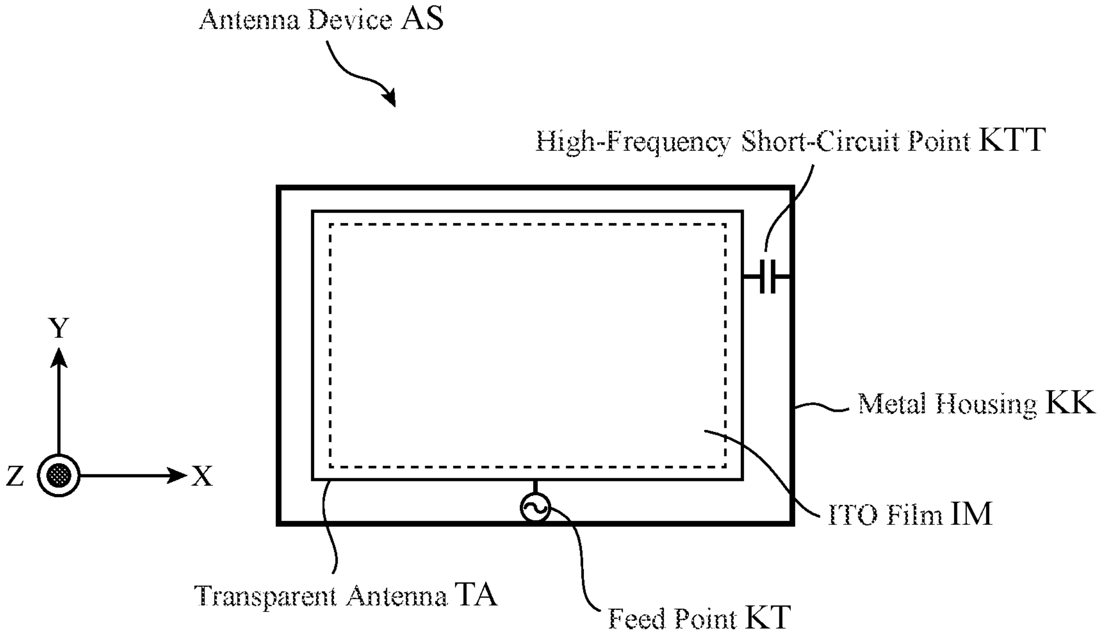
FIG. 13A is a plan view illustrating a configuration (part 1) of an antenna device AS according to a sixth embodiment.

As illustrated in FIG. 13A, the high-frequency short-circuit point KTT short-circuits the transparent antenna TA and the metal housing KK in a high frequency band, specifically, short-circuits by capacitive coupling and conduction through a metal wire. By the transparent antenna TA and the metal housing KK being short-circuited in a high frequency band, the distribution of the current (not illustrated) flowing on the transparent antenna TA changes. As a result, the impedance when viewing the side of the transparent antenna TA from the feed point KT of the sixth embodiment changes. In other words, by adjusting the position where the high-frequency short-circuit point KTT is disposed, the impedance when viewing the side of the transparent antenna TA from the feed point KT of the sixth embodiment can be adjusted.

<Case of Two High-Frequency Short-Circuit Points>

Figure 13B:
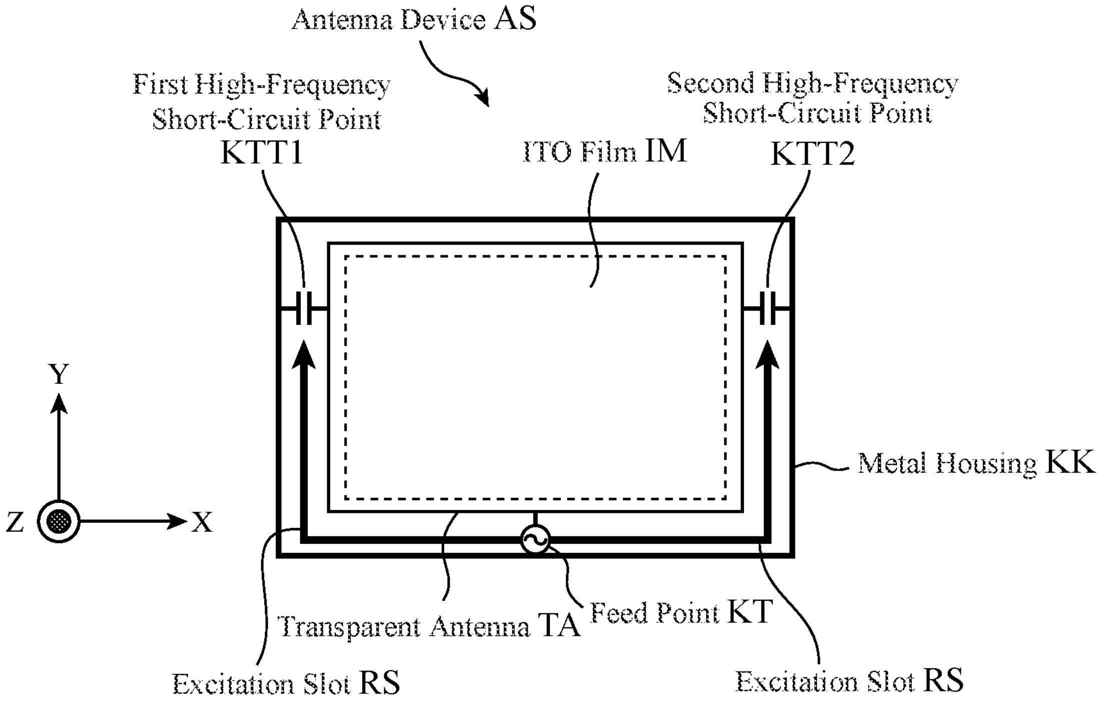
FIG. 13B is a plan view illustrating a configuration (part 2) of the antenna device AS according to the sixth embodiment.

As illustrated in FIG. 13B, a first high frequency short-circuit point KTT1 and a second high-frequency short-circuit point KTT2 short-circuit the transparent antenna TA and the metal housing KK in a high frequency band at the individual positions.

Due to the short circuit, the distribution of the current (not illustrated) flowing through the transparent antenna TA changes as described above with reference to FIG. 13A. As a result, the impedance when viewing the side of the transparent antenna TA from the feed point KT of the sixth embodiment changes.

The impedance of the antenna device AS is changed by the short circuit, and as illustrated in FIG. 13B, an excitation slot RS is defined to extend from the first high-frequency short-circuit point KTT1 to the second high-frequency short-circuit point KTT2 across the feed point KT.

A magnetic current flows through the excitation slot RS, and the operating frequency of the antenna device is defined based on the length of the excitation slot RS.

As illustrated in FIG. 13B, by including two high-frequency short-circuit points KTT, that is, the first high-frequency short-circuit point KTT1 and the second high-frequency short-circuit point KTT2, the impedance of the antenna device AS according to the sixth embodiment can be adjusted similarly to the case where only one high-frequency short-circuit point KTT is provided as illustrated in FIG. 13A, and on the other hand, unlike the case where only one high-frequency short-circuit point KTT is provided as illustrated in FIG. 13A, the operating frequency of the antenna device AS can be adjusted by changing the positions of the high-frequency short-circuit points KTT1 and KTT2 to change the length of the excitation slot RS.

SEVENTH EMBODIMENT

Seventh Embodiment

An antenna device according to a seventh embodiment will be described.

Configuration of Seventh Embodiment

Figure 14:
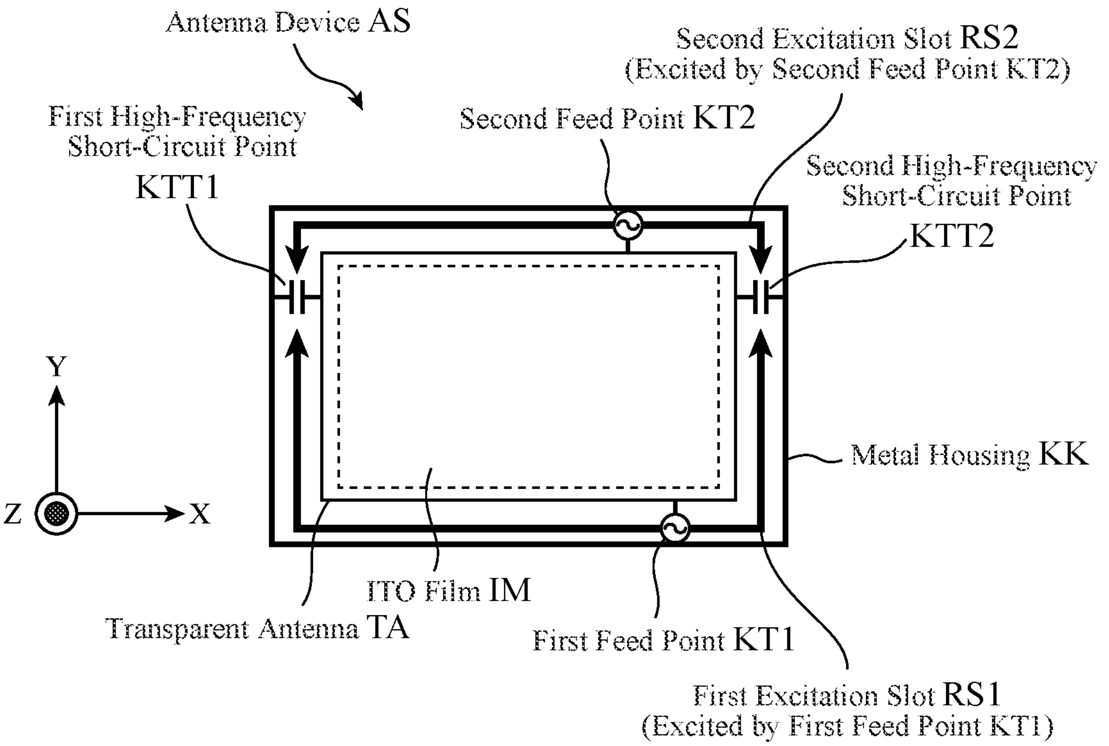
FIG. 14 illustrates a configuration of an antenna device AS according to a seventh embodiment.

FIG. 14 illustrates a configuration of an antenna device AS according to the seventh embodiment.

As illustrated in FIG. 14, the configuration of the antenna device AS according to the seventh embodiment is basically similar to the configuration of the antenna device AS according to the first embodiment (illustrated in FIG. 2).

As illustrated in FIG. 14, unlike the antenna device AS according to the first embodiment, the antenna device AS according to the seventh embodiment includes two feed points KT and two high-frequency short-circuit points KTT, that is, the first feed point KT1 and the second feed point KT2, and the first high-frequency short-circuit point KTT1 and the second high-frequency short-circuit point KTT2.

The first high-frequency short-circuit point KTT1 corresponds to "first short-circuit unit", and the second high-frequency short-circuit point KTT2 corresponds to "second short-circuit unit".

The second gap SM2 is divided into two slots, that is, a first excitation slot RS1 and a second excitation slot RS2, by the first high-frequency short-circuit point KTT1 and the second high-frequency short-circuit point KTT2, in other words, the first excitation slot RS1 and the second excitation slot RS2 are formed.

The first feed point KT1 is disposed in the first excitation slot RS1, whereas the second feed point KT2 is disposed in the second excitation slot RS2.

In other words, in the first excitation slot RS1, the first high-frequency short-circuit point KTT1 and the second high-frequency short-circuit point KTT2 are present at end points, and the first feed point KT1 is present at an inner point. Similarly, in the second excitation slot RS2, the first high-frequency short-circuit point KTT1 and the second high-frequency short-circuit point KTT2 are present at end points, and the second feed point KT2 is present at an inner point.

The high-frequency current (not illustrated) supplied by the first feed point KT1 has, for example, a frequency F1. On the other hand, the high-frequency current (not illustrated) supplied by the second feed point KT2 has, for example, a frequency F2 higher than the frequency F1.

As illustrated in FIG. 14, the first excitation slot RS1 is longer than the second excitation slot RS2. As a result, the first excitation slot RS1 is suitable to operate in a relatively low frequency band, for example, at the frequency F1, whereas the second excitation slot RS2 is suitable to operate in a relatively high frequency band, for example, at the frequency F2.

Instead of arranging both the first feed point KT1 and the second feed point KT2, for example, only the first feed point KT1 is disposed and the second feed point KT2 is not disposed, and power may be supplied from the first feed point KT1 to the second excitation slot RS2 by electromagnetic coupling or the like.

Operation and Effect of Seventh Embodiment

The first excitation slot RS1 operates at the frequency F1 by being excited at the first feed point KT1, whereas the second excitation slot RS2 operates at the frequency F2 by being excited at the second feed point KT2. As a result, one slot antenna including the first excitation slot RS1 can be operated at the frequency F1, and similarly, another slot antenna including the second excitation slot RS2 can be operated at the frequency F2. Therefore, the antenna device AS according to the seventh embodiment can be adopted in a multiband antenna system operating at a plurality of different frequencies.

In addition to the above effect, since the second gap SM2 is divided into the first excitation slot RS1 and the second excitation slot RS2, in other words, since the second gap SM2 is not occupied by only one of the first excitation slot RS1 and the second excitation slot RS2, it is possible to save the space of the multiband antenna system.

EIGHTH EMBODIMENT

Eighth Embodiment

An antenna device according to an eighth embodiment will be described.

Configuration of Eighth Embodiment

Figure 15:
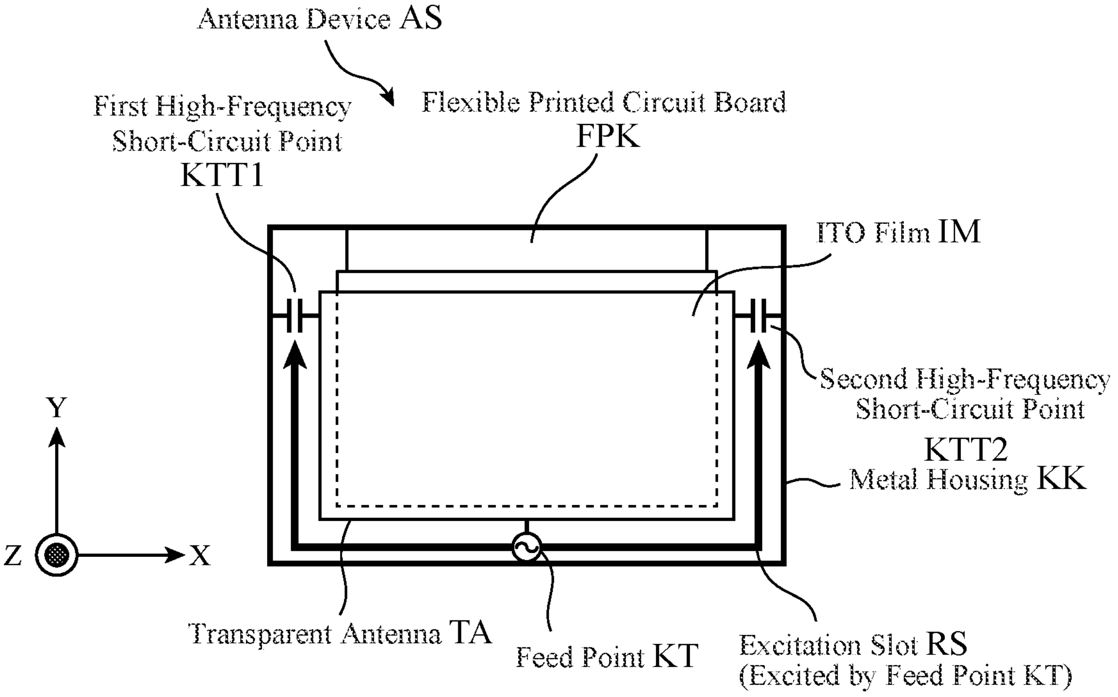
FIG. 15 illustrates a configuration of an antenna device AS according to an eighth embodiment.

FIG. 15 illustrates a configuration of an antenna device AS according to the eighth embodiment.

As illustrated in FIG. 15, the configuration of the antenna device AS according to the eighth embodiment is basically similar to the configuration of the antenna device AS according to the first embodiment.

As illustrated in FIG. 15, unlike the antenna device AS according to the first embodiment, the antenna device AS according to the eighth embodiment includes a flexible printed circuit board FPK and two high-frequency short-circuit points KTT, that is, the first high-frequency short-circuit point KTT1 and the second high-frequency short-circuit point KTT2.

The flexible printed circuit board FPK corresponds to "connection unit".

The flexible printed circuit board FPK electrically connects the ITO film IM and the metal housing KK.

The first high-frequency short-circuit point KTT1 and the second high-frequency short-circuit point KTT2 short-circuit between the transparent antenna TA and the metal housing KK.

In plan view (XY plane view) of the flexible printed circuit board FPK from the outside of the metal housing KK, the first high-frequency short-circuit point KTT1, the second high-frequency short-circuit point KTT2, and the feed point KT are provided at positions not overlapping the position of the flexible printed circuit board FPK.

Operation and Effect of Eighth Embodiment

If the second gap SM2 (corresponding to the gap SM illustrated in FIG. 1) through which the magnetic flow JR (illustrated in FIG. 1) flows is present above the flexible printed circuit board FPK (in a direction along the Z axis toward the outside of the metal housing KK) and between the transparent antenna TA and the metal housing KK, a current (not illustrated) is excited in the flexible printed circuit board FPK by the magnetic flow JR flowing through the second gap SM2. A current also flows through the ITO film IM, and as a result, the radiation efficiency is deteriorated.

In the antenna device AS according to the eighth embodiment, as described above, in the XY plane view, the first high-frequency short-circuit point KTT1, the second high-frequency short-circuit point KTT2, and the feed point KT are provided at positions not overlapping the position of the flexible printed circuit board FPK. As a result, the second gap SM2, in other words, the excitation slot RS is not present above the flexible printed circuit board FPK. Therefore, it is possible to avoid the loss due to the current flowing through the ITO film IM, and as a result, the radiation efficiency can be improved.

NINTH EMBODIMENT

Ninth Embodiment

An antenna device according to a ninth embodiment will be described.

Configuration of Ninth Embodiment

FIG. 16 illustrates a configuration of an antenna device AS according to the ninth embodiment.

FIG. 17 illustrates a configuration of an antenna device AD according to a comparative example of the ninth embodiment.

As illustrated in FIG. 16, the configuration of the antenna device AS according to the ninth embodiment is basically similar to the configuration of the antenna device AS according to the first embodiment (illustrated in FIG. 2).

In the antenna device AS according to the ninth embodiment, unlike the antenna device AS according to the first embodiment, the transparent antenna TA is defined in relation to a metal bezel KB. With the definition, the antenna device AS according to the ninth embodiment is determined as an exception to the antenna device AS according to the second embodiment in which the transparent antenna TA and the ITO film IM have the same shape and size.

As described above with reference to FIG. 1B, the transparent antenna TA is formed on the antenna base material AK, in other words, supported by the antenna base material AK.

Figure 16A:
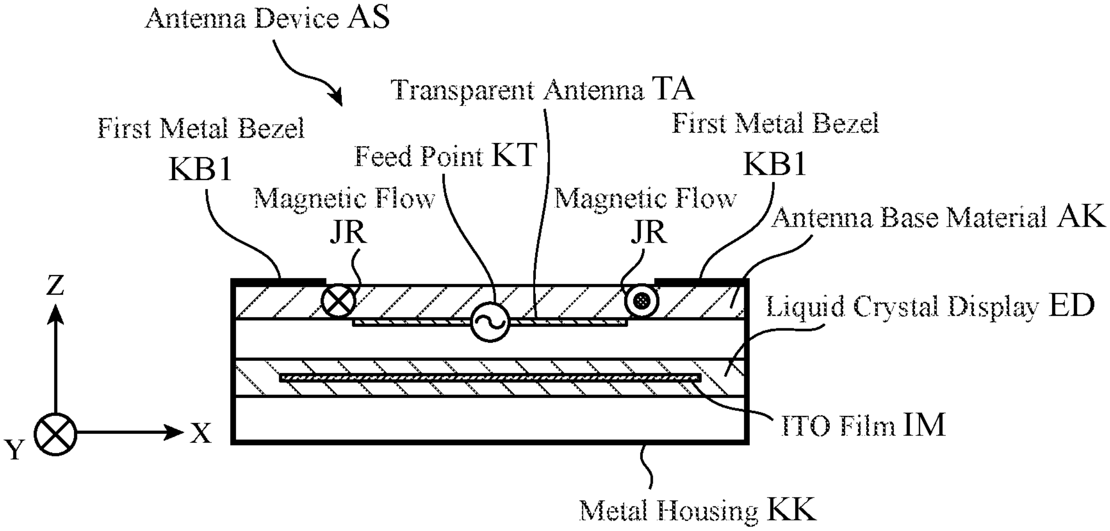
FIG. 16A illustrates a configuration (part 1) of an antenna device AS according to a ninth embodiment.
Figure 16B:
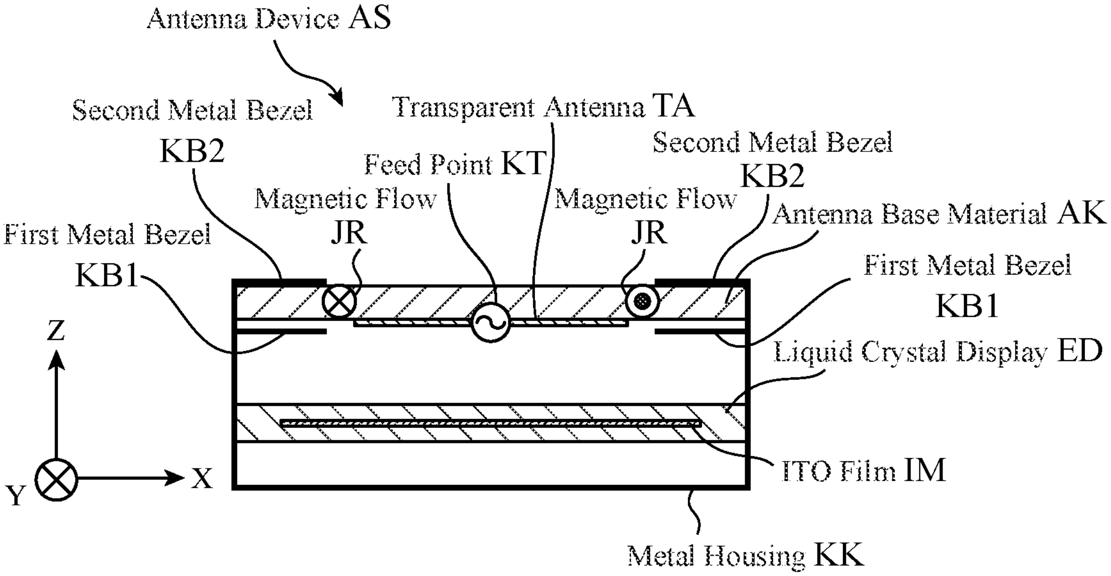
FIG. 16B illustrates a configuration (part 2) of the antenna device AS according to the ninth embodiment.

In the antenna device AS according to the ninth embodiment, the metal housing KK includes a first metal bezel KB1 as illustrated in FIG. 16A, or includes the first metal bezel KB1 and a second metal bezel KB2 as illustrated in FIG. 16B.

Figure 17A:
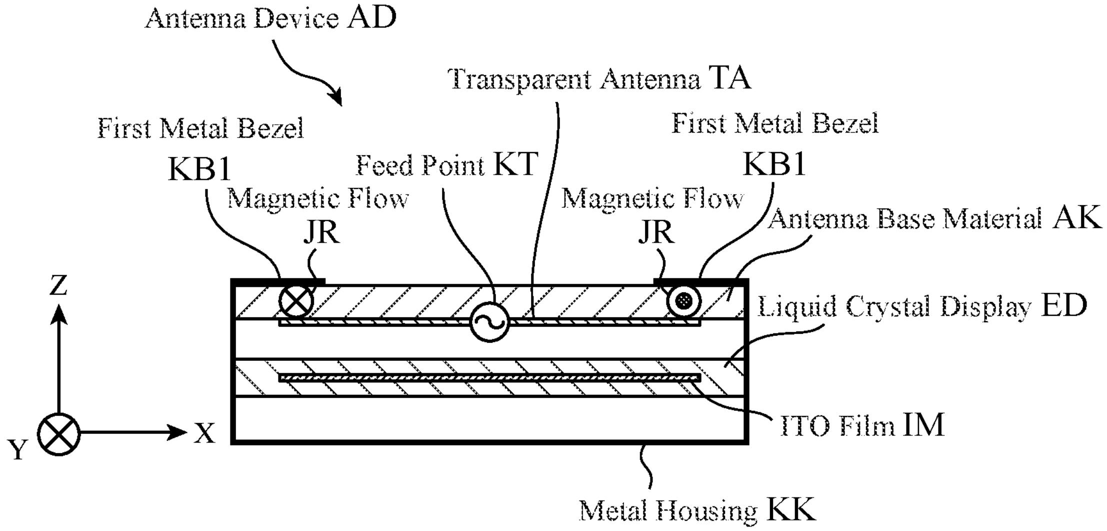
FIG. 17A illustrates a configuration (part 1) of an antenna device AD according to a comparative example of the ninth embodiment.
Figure 17B:
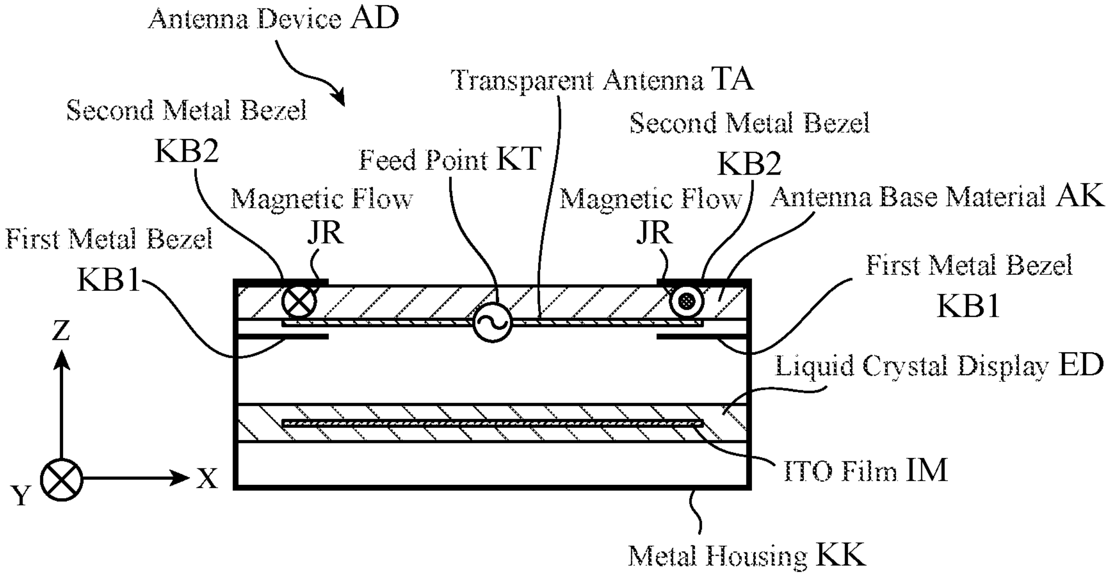
FIG. 17B illustrates a configuration (part 2) of the antenna device AD according to the comparative example of the ninth embodiment.

Similarly to the above, also in the antenna device AD according to the comparative example, the metal housing KK includes a first metal bezel KB1 as illustrated in FIG. 17A, or includes the first metal bezel KB1 and a second metal bezel KB2 as illustrated in FIG. 17B.

The first metal bezel KB1 (illustrated in FIGS. 16A and 17A) and the second metal bezel KB2 (illustrated in FIGS. 16B and 17B) are provided at positions spaced apart from the transparent antenna TA in the outside direction.

In any of the configuration of the antenna device AS according to the ninth embodiment described above and the configuration of the antenna device AD according to the comparative example described above, as illustrated in FIGS. 16 and 17, in plan view from the opening of the metal housing KK, that is, in the XY plane view, the opening of the metal housing KK is narrower than the ITO film IM.

In the antenna device AS according to the ninth embodiment, unlike the antenna device AD according to the comparative example, in plan view of the transparent antenna TA from the outside, at least a part of the transparent antenna TA is not located outside any of the opening defined by the first metal bezel KB1 (FIG. 16A) and the opening defined by the second metal bezel KB2 (FIG. 16B). In other words, in the XY plane view, the entire transparent antenna TA is present in the opening defined by the first metal bezel KB1 (FIG. 16A), and is present in the opening defined by the second metal bezel KB2 (FIG. 16B).

Case of Comparative Example

In the antenna device AD according to the comparative example, as illustrated in FIGS. 17A and 17B, the transparent antenna TA and the ITO film IM have the same shape and size in the XY plane view. The magnetic flow JR serving as a radiation source of radio waves is generated between the edge FB (illustrated in FIGS. 1A and 1B, including the vicinity of the edge FB, and the same applies hereinafter) of the transparent antenna TA and the first metal bezel KB1 as illustrated in FIG. 17A, and is generated between the edge FB of the transparent antenna TA and the second metal bezel KB2 as illustrated in FIG. 17B.

Although the radio waves with the magnetic flow JR as a radiation source try to travel toward the opening of the metal housing KK, a part of the radio waves is disturbed by the first metal bezel KB1 as is clear from FIG. 17A, and is disturbed by the second metal bezel KB2 as is clear from FIG. 17B.

Case of Ninth Embodiment

In the antenna device AS according to the ninth embodiment, although the transparent antenna TA and the ITO film IM have the same shape, have different sizes. More specifically, as illustrated in FIG. 16A, the transparent antenna TA is smaller than the opening of the first metal bezel KB1 in the XY plane view. Similarly, as illustrated in FIG. 16B, the transparent antenna TA is smaller than the opening of the metal bezel KB2 in the XY plane view. As a result, the radio waves with the magnetic flow JR as a radiation source try to travel toward the opening of the metal housing KK, a part of the radio waves is not disturbed by the first metal bezel KB1 as illustrated in FIG. 16A, and is not disturbed by the second metal bezel KB2 as illustrated in FIG. 16B. As a result, the radiation efficiency can be improved as compared with the comparative example described above.

TENTH EMBODIMENT

Tenth Embodiment

An antenna device according to a tenth embodiment will be described.

Configuration of Tenth Embodiment

Figure 18:
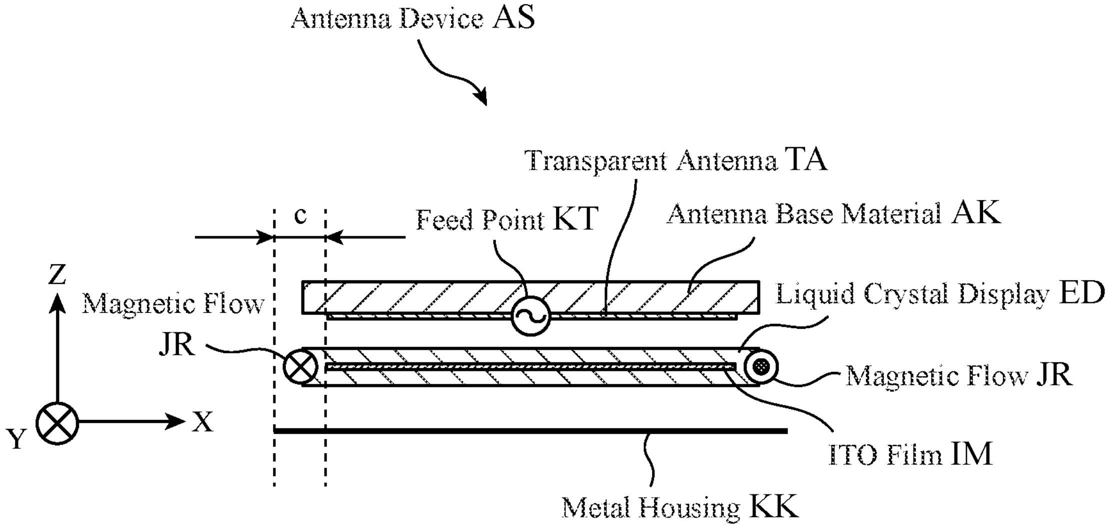
FIG. 18 illustrates a configuration of an antenna device AS according to a tenth embodiment.

FIG. 18 illustrates a configuration of an antenna device AS according to the tenth embodiment.

As illustrated in FIG. 18, the configuration of the antenna device AS according to the tenth embodiment is basically similar to the configuration of the antenna device AS according to the first embodiment (illustrated in FIG. 2).

The antenna device AS according to the tenth embodiment is different from the antenna device AS according to the first embodiment in that, as illustrated in FIG. 18, the metal housing KK has only one bottom surface instead of four side surfaces and one bottom surface.

The edge FB (illustrated in FIGS. 1A and 1B, including the vicinity of the edge FB, and the same applies hereinafter) of the transparent antenna TA in the one bottom surface, that is, the metal housing KK is made of metal, but other portions do not need to be made of metal.

Unlike the first embodiment in which the second gap SM2 (corresponding to the gap SM in FIGS. 1A and 1B) is defined between the edge FB of the transparent antenna TA and the portion of "side surface" of the metal housing KK closest to the edge FB of the transparent antenna TA, as clear from FIG. 18, the second gap SM2 is defined between the edge FB of the transparent antenna TA and the portion of "bottom surface" of the metal housing KK closest to the edge FB of the transparent antenna TA.

The length c of the second gap SM2 in the tenth embodiment corresponds to the length b (shown in FIG. 4A) of the second gap SM2 in the second embodiment.

Operation and Effect of Tenth Embodiment

The magnetic flow JR flows through the second gap SM2 of the tenth embodiment. Similarly to the magnetic flow JR flowing through the second gap SM2 of the first embodiment, the magnetic flow JR serves as a radiation source of radio waves. As a result, the radiation efficiency can be improved as in the first embodiment.

Modifications Common to First Embodiment to Tenth Embodiment

For the feeder line KS (for example, corresponding to the feeder line KS2 illustrated in FIG. 11) between the transparent antenna TA and the feed point KT, for example, a flexible printed circuit board (for example, similar to the flexible printed circuit board FPK illustrated in FIG. 15) may be used from the viewpoint of flexibility. For example, compression bonding (ACF bonding) using an anisotropic conductive film may be used to electrically connect the flexible printed circuit board to the transparent antenna TA.

The above embodiments may be combined without departing from the gist of the present disclosure, and components in each embodiment may be appropriately omitted, changed, or other components may be added.

INDUSTRIAL APPLICABILITY

The antenna device according to the present disclosure can be used to suppress a decrease in the radiation efficiency of a transparent antenna.

Reference Signs List a: Variable, AD: Antenna device, AK: Antenna base material, AS: Antenna device, b: Variable, CTD: Adjustment transparent conductor-plate, DR: Current, ED: Liquid crystal display, F1: Operating frequency, F2: Operating frequency, FB: Edge, FPK: Flexible printed circuit board, GK: Decoupling circuit, IM: ITO film, JR1: First magnetic flow, JR2: Second magnetic flow, JR3: Third magnetic flow, JR4: Fourth magnetic flow, KB1: First metal bezel, KB2: Second metal bezel, KK: Metal housing, KS: Feeder line, KS1: First feeder line, KS2: Second feeder line, KT1: First feed point, KT2: Second feed point, KTT1: First high-frequency short-circuit point, KTT2: second high-frequency short-circuit point, RS: Excitation slot, RS1: First excitation slot, RS2: Second excitation slot, SM: Gap, SM1: First gap, SM2: Second gap, TA: Transparent antenna

The invention claimed is:

1. An antenna device comprising:

a metal housing in which at least one surface thereof is open;

a display circuit provided inside the metal housing and configured to perform a display from the one surface of the metal housing toward outside;

a first transparent conductor plate present in the display circuit, the first transparent conductor plate to define a first gap between the first transparent conductor plate and the metal housing;

a second transparent conductor plate provided to be spaced apart from the first transparent conductor plate in an outside or inside direction, the second transparent conductor plate to define a second gap between the second transparent conductor plate and the metal housing; and a feeder provided between the metal housing and the second transparent conductor plate, wherein when a length of the first gap is different from a length of the second gap, a ratio of an area of the second transparent conductor plate with respect to an area of the first transparent conductor plate is 0.6 or more and 1.1 or less.

2. The antenna device according to claim 1, wherein the first transparent conductor plate and the second transparent conductor plate have a same shape.

3. The antenna device according to claim 2, wherein the first transparent conductor plate and the second transparent conductor plate have a same dimension.

4. The antenna device according to claim 2, wherein the same shape is any of a trapezoid, a rectangle, an ellipse, and a circle.

5. The antenna device according to claim 1, further comprising an adjustment transparent conductor-plate provided between the feeder and the second transparent conductor plate to adjust an impedance of the second transparent conductor plate.

6. The antenna device according to claim 1, further comprising:

a second feeder provided between the metal housing and the second transparent conductor plate; and a decoupling circuit provided between a first feeder that is the feeder, and the second feeder.

7. The antenna device according to claim 1, further comprising a second feeder provided between the metal housing and the second transparent conductor plate, wherein a first current supplied from a first feeder that is the feeder and a second current supplied from the second feeder flow orthogonally to each other.

8. The antenna device according to claim 1, further comprising at least one short-circuit provided between the metal housing and the second transparent conductor plate.

9. The antenna device according to claim 8, further comprising:

a second feeder provided between the metal housing and the second transparent conductor plate; and a first short-circuit and a second short-circuit provided between the metal housing and the second transparent conductor plate, wherein the gap is divided into a first slot and a second slot, a length of the first slot in which the first short-circuit and the second short-circuit are present at end points and a first feeder that is the feeder is present at an inner point is different from a length of the second slot in which the first short-circuit and the second short-circuit are present at end points and the second feeder is present at an inner point.

10. The antenna device according to claim 8, further comprising a connection circuit to connect the metal housing and the first transparent conductor plate to each other, wherein in plan view of the connection circuit from the outside, the at least one short-circuit is provided in such a manner that positions of the at least one short-circuit and the feeder do not overlap a position of the connection circuit.

11. The antenna device according to claim 1, further comprising a metal bezel provided at a position spaced apart from the second transparent conductor plate in the outside direction, wherein in plan view of the second transparent conductor plate from the outside, at least a part of the second transparent conductor plate is not located outside an opening defined by the metal bezel.

12. The antenna device according to claim 1, further comprising a flexible printed circuit board to connect the second transparent conductor plate and the feeder to each other, the flexible printed circuit board being bonded to the second transparent conductor plate.

13. The antenna device according to claim 1, wherein the metal housing includes at least one of a side surface or a bottom surface.

* * * * *